US008060627B2

(12) United States Patent
Rosenblatt et al.

(10) Patent No.: US 8,060,627 B2
(45) Date of Patent: Nov. 15, 2011

(54) DEVICE-TO-DEVICE WORKFLOWS

(75) Inventors: Michael Rosenblatt, Campbell, CA (US); Gloria Lin, San Ramon, CA (US); Sean Anthony Mayo, Dover, NH (US); Taido Lantz Nakajima, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 385 days.

(21) Appl. No.: 12/286,409

(22) Filed: Sep. 30, 2008

(65) Prior Publication Data

US 2010/0082821 A1 Apr. 1, 2010

(51) Int. Cl.
*G06F 15/16* (2006.01)
(52) U.S. Cl. ...................................................... 709/228
(58) Field of Classification Search ................. 455/3.05; 715/810
See application file for complete search history.

(56) References Cited

U.S. PATENT DOCUMENTS

| | | | |
|---|---|---|---|
| 4,701,601 A | 10/1987 | Francini et al. | |
| 4,868,376 A | 9/1989 | Lessin et al. | |
| 5,276,311 A | 1/1994 | Hennige | |
| 5,917,913 A | 6/1999 | Wang | |
| 6,175,922 B1 | 1/2001 | Wang | |
| 6,288,716 B1* | 9/2001 | Humpleman et al. | 715/733 |
| 6,400,270 B1 | 6/2002 | Person | |
| 6,684,269 B2 | 1/2004 | Wagner | |
| 6,694,387 B2 | 2/2004 | Wagner | |
| 7,089,214 B2 | 8/2006 | Wang | |
| 7,128,274 B2 | 10/2006 | Kelley et al. | |
| 7,240,036 B1 | 7/2007 | Mamdani et al. | |
| 7,334,728 B2 | 2/2008 | Williams | |
| 7,376,591 B2 | 5/2008 | Owens | |
| 7,464,050 B1 | 12/2008 | Deaton et al. | |
| 2002/0082931 A1 | 6/2002 | Siegel et al. | |
| 2002/0178088 A1 | 11/2002 | Lurie et al. | |
| 2004/0143597 A1* | 7/2004 | Benson et al. | 707/104.1 |
| 2004/0203352 A1* | 10/2004 | Hall et al. | 455/41.1 |
| 2005/0116027 A1 | 6/2005 | Algiene et al. | |
| 2005/0125343 A1 | 6/2005 | Mendelovich | |
| 2005/0131871 A1 | 6/2005 | Howard et al. | |
| 2005/0222961 A1 | 10/2005 | Staib et al. | |

(Continued)

FOREIGN PATENT DOCUMENTS

EP 1331561 A2 7/2003

(Continued)

OTHER PUBLICATIONS

K. Penttila, et al.; "Use and interface definition of mobile RFID reader integrated in a smart phone," Consumer Electronics, 2005, Proceedings of the 9th International Symposium on Macau SAR, Jun. 14-16, 2005, IEEE, Jun. 14, 2005, pp. 353-358.

(Continued)

*Primary Examiner* — Asad Nawaz
(74) *Attorney, Agent, or Firm* — Fletcher Yoder PC

(57) ABSTRACT

Systems, methods, and devices are provided for performing a workflow with two or more electronic devices. Embodiments include an initiator electronic device that may function to control the workflow and send instructions for executing the workflow to a target electronic device. The initiator device may generate instructions for the workflow based on properties received from the target device. The instructions generated by the initiator may allow both devices to accomplish a shared goal, such as exchanging contact information. In some embodiments, the initiator device may include a graphical user interface for creating workflows, downloading workflows from a web service, and entering preferences governing the performance of the workflows.

28 Claims, 14 Drawing Sheets

U.S. PATENT DOCUMENTS

| | | | |
|---|---|---|---|
| 2006/0111944 A1 | 5/2006 | Sirmans et al. | |
| 2006/0213972 A1 | 9/2006 | Kelley et al. | |
| 2006/0243609 A1 | 11/2006 | Cole et al. | |
| 2006/0266822 A1 | 11/2006 | Kelley et al. | |
| 2006/0287004 A1 | 12/2006 | Fuqua | |
| 2007/0022058 A1 | 1/2007 | Labrou et al. | |
| 2007/0150369 A1* | 6/2007 | Zivin | 705/26 |
| 2007/0190939 A1 | 8/2007 | Abel | |
| 2007/0205275 A1 | 9/2007 | Nicola et al. | |
| 2007/0228179 A1 | 10/2007 | Atkinson | |
| 2007/0235539 A1 | 10/2007 | Sevanto et al. | |
| 2007/0255652 A1 | 11/2007 | Tumminaro et al. | |
| 2007/0265033 A1 | 11/2007 | Brostrom | |
| 2007/0278290 A1* | 12/2007 | Messerges et al. | 235/380 |
| 2008/0005195 A1* | 1/2008 | Li | 707/203 |
| 2008/0052243 A1 | 2/2008 | Narayanaswami et al. | |
| 2008/0059323 A1* | 3/2008 | Chang et al. | 705/26 |
| 2008/0113614 A1* | 5/2008 | Rosenblatt | 455/3.05 |
| 2008/0154734 A1* | 6/2008 | Fernandez et al. | 705/16 |
| 2008/0259829 A1 | 10/2008 | Rosenblatt | |
| 2008/0261528 A1 | 10/2008 | Rosenblatt | |
| 2008/0261529 A1 | 10/2008 | Rosenblatt | |
| 2008/0304644 A1* | 12/2008 | Mishra et al. | 379/201.12 |
| 2009/0210676 A1* | 8/2009 | Luick | 712/220 |
| 2009/0210677 A1* | 8/2009 | Luick | 712/220 |
| 2010/0213251 A1* | 8/2010 | Hvidtfeldt | 235/375 |

FOREIGN PATENT DOCUMENTS

| | | | |
|---|---|---|---|
| WO | 02/08863 | A2 | 1/2002 |
| WO | 2008/112497 | A1 | 9/2008 |
| WO | 2009/018255 | A2 | 2/2009 |

OTHER PUBLICATIONS

NFC Forum; Near Field Communication and the NFC Forum: The Keys to Truly Interoperable Communications; http://www.nfc-forum.org/resources/white_papers/nfc_forum_marketing_white_paper.pdf; Wakefield, MA, USA 2007.

Near Field Communication in the real world part I; Turning the NFC promise into profitable, everyday applications; http://www.nfc-forum.org/resources/white_papers/Innovision_ whitePaper1.pdf ; Innovation Research & Technology plc; Gloucestershire, United Kingdom.

Near Field Communication in the real world part II, Using the right NFC tag type for the right NFC application; http://www.nfc-forum.org/resources/white_papers/Innovision_whitePaper2.pdf ; Innovation Research & Technology plc; Gloucestershire, United Kingdom.

Near Field Communication in the real world part III, Moving to System on Chip (SoC) integration; http://www.nfc-forum.org/resources/white_papers/Innovision_whitePaper3.pdf ; Innovation Research & Technology plc; Gloucestershire, United Kingdom 2007.

Ricker Thomas; Nokia's 6212 with Bluetooth NFC: Let the Pairing revolution being!; http://www.engadget.com/2008104/15/nokias-6212-with-bluetooth-nfc-let-the-pairing-revolution-begi/; Engadget; 2008.

NFC trial in NYC enables merchant and transit payment via cell phones; http://www.contactlessnews.com/2006/12/14/nfc-trial-in-nyc-enables-merchant-and-transit-payments-via-cell-phones; Citi/ATT/MasterCard/Nokia run trial in NYC with MTA et al.; Contactless News; 2008.

Port Authority, NJ Transit to test contactless cards; http://www.contactlessnews.com/2008/02/25/port-authority-nj-transit-to-test-contactless-cards/; Port Authority/NJ Transit run compatible trial with NYC; Contactless News 2008.

Bart NFC trial first to use mobile phones to pay for fares, food; http://www.contactlessnews.com/2008/01/29/bart-nfc-trial-first-to-use-mobile-phones-to-pay-for-fares-food/; Bart et al. run trial for automated food and transit payments; Contactless News 2008.

New NFC trial launched in Spokane; U.S. Bank/MasterCard run trial in Spokane, WA; http://www.contactlessnews.com/2008/01/28/new-nfc-trial-launched-in-spokane/; Contactless News 2008.

* cited by examiner

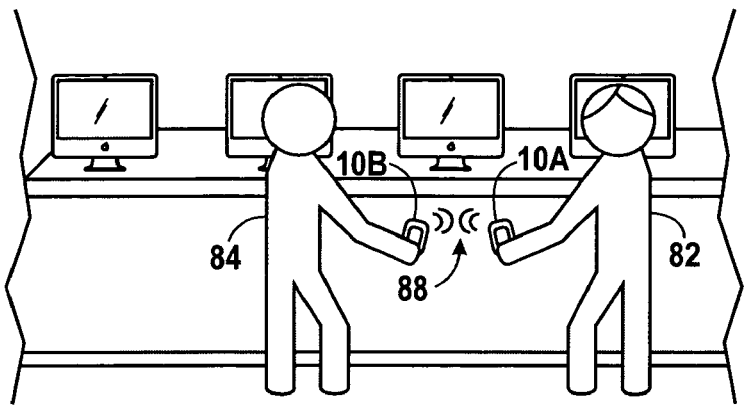
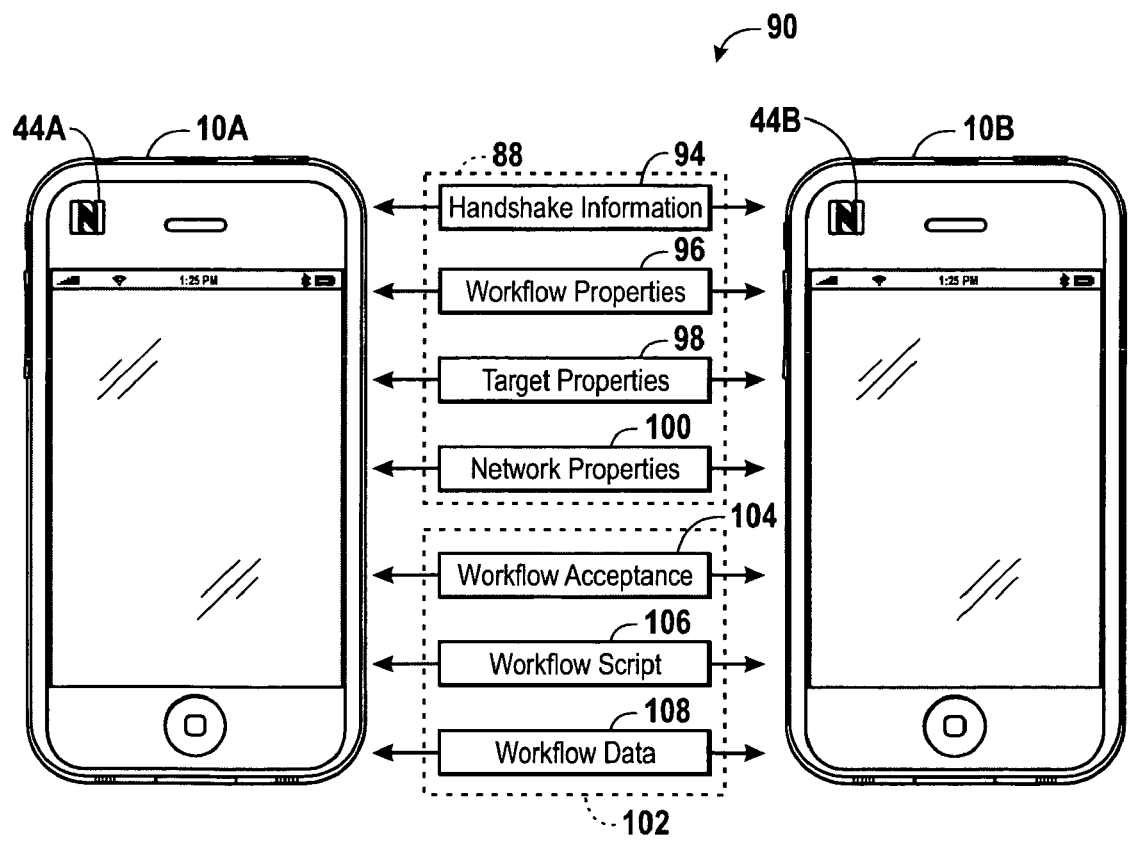
FIG. 4
FIG. 5

DEVICE-TO-DEVICE WORKFLOWS

BACKGROUND OF THE INVENTION

1. Field of the Invention

Embodiments of the present disclosure relate generally to workflows that may be performed on electronic devices and, more particularly to shared execution of workflows on multiple electronic devices.

2. Description of the Related Art

This section is intended to introduce the reader to various aspects of art that may be related to various aspects of the present disclosure, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Consumers frequently store many types of data on electronic devices, such as cellular telephones, portable media players, laptop computers, and personal data assistants. For example, consumers may store contact information, calendar appointments, to-do lists, pictures, and links to web pages on electronic devices. Due to the increasing portability of electronic devices, consumers frequently share data stored on electronic devices with other people. For example, consumers may exchange shopping lists or contact information stored on electronic devices over the Internet, through flash drives, or over serial connections.

Typically, several actions are required to transfer data to and between electronic devices. For example, to create a new contact file, a consumer may perform the following steps: open a mail application, enter the contact person's phone number and email address, select a ring tone, open a camera application, take a picture of the person, and store the picture with the contact file. The consumer may frequently repeat the same series of steps each time a new contact is added. The consumer also may need to instruct the other person on how to generate or transmit the requested data. Further, electronic devices may operate using different operating systems and software applications. Additional steps may be required to convert information on one device into a format compatible with another device. The series of repeated steps may be complicated and time consuming.

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

The present disclosure generally relates to techniques for performing workflows, or groups of actions, using an electronic device acting as an initiator. In accordance with one disclosed embodiment, the initiator device may store several workflows for performing actions such as exchanging contact information, synchronizing calendars, and exchanging to-do lists with another electronic device acting as a target. The initiator device also may store workflows for transferring files between the initiator device and the target device. The initiator device may be capable of transmitting instructions for the workflow to the target device to enable the target device to work with the initiator device to complete the workflow. The instructions may be selected and/or generated based on properties of the target device, such as the operating system, input devices, and/or applications included in the target device. The properties may also include network configuration information for the target device.

The initiator device may include one or more communication interfaces for communicating with the target device. In accordance with one embodiment, the initiator device may include a close range communication interface, such as a near field communication interface, for establishing a communication link with the target device. The properties of the target device may be requested and received over this communication link. Based on the properties, the initiator device may establish a network connection with the target device for exchanging workflow instructions and data. The target device may use the workflow instructions to retrieve and/or generate data for the workflow. The instructions may allow the target device to generate data for an application included on the initiator device, even if that application is not included on the target device. The initiator device may use the data from the target device to complete one or more actions in the workflow.

In accordance with further embodiments, the initiator device may include an application for creating and/or editing workflows. The initiator device also may be capable of downloading workflows from an external database through a web service. Further, the initiator device may include a graphical user interface for receiving user preferences specifying operational parameters for the workflows.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 4 is an illustration of a workflow performed through an initiator device and a target device in accordance with one embodiment;

FIG. 5 is a schematic view of communications between an initiator device and a target device during a workflow in accordance with one embodiment;

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to techniques for performing a workflow with two or more electronic devices. A workflow may generally include a sequence of one or more actions that can be performed using an initiator electronic device and a target electronic device. The workflow includes instructions for performing each action in the action sequence in a specific order, and the instructions may include a set of instructions for the initiator electronic device and a set of instructions for the target electronic device. The actions within a workflow may represent any of the actions that an electronic device is capable of performing, such as storing contact information, taking a picture, or sending email, among other things. Further, the actions may include accessing multiple applications and inputs included on an electronic device. For example, an action of storing contact information may require receiving contact information through a network interface of the electronic device, opening an electronic address book application, and storing the received contact information in the electronic address book.

One device may function as the initiator electronic device to control the workflow and send instructions for executing the workflow to the target electronic device. The instructions generated by the initiator may allow both devices to accomplish a shared goal. For example, the initiator device may have a workflow for adding a new contact that includes receiving an electronic business card and adding the contact as a friend on a social networking site such as Facebook. However, the target device may not have this workflow installed. The initiator may generate a workflow script for performing these actions and may send the workflow script to the target device so that both devices, target and initiator, may perform these actions.

Figure 1:
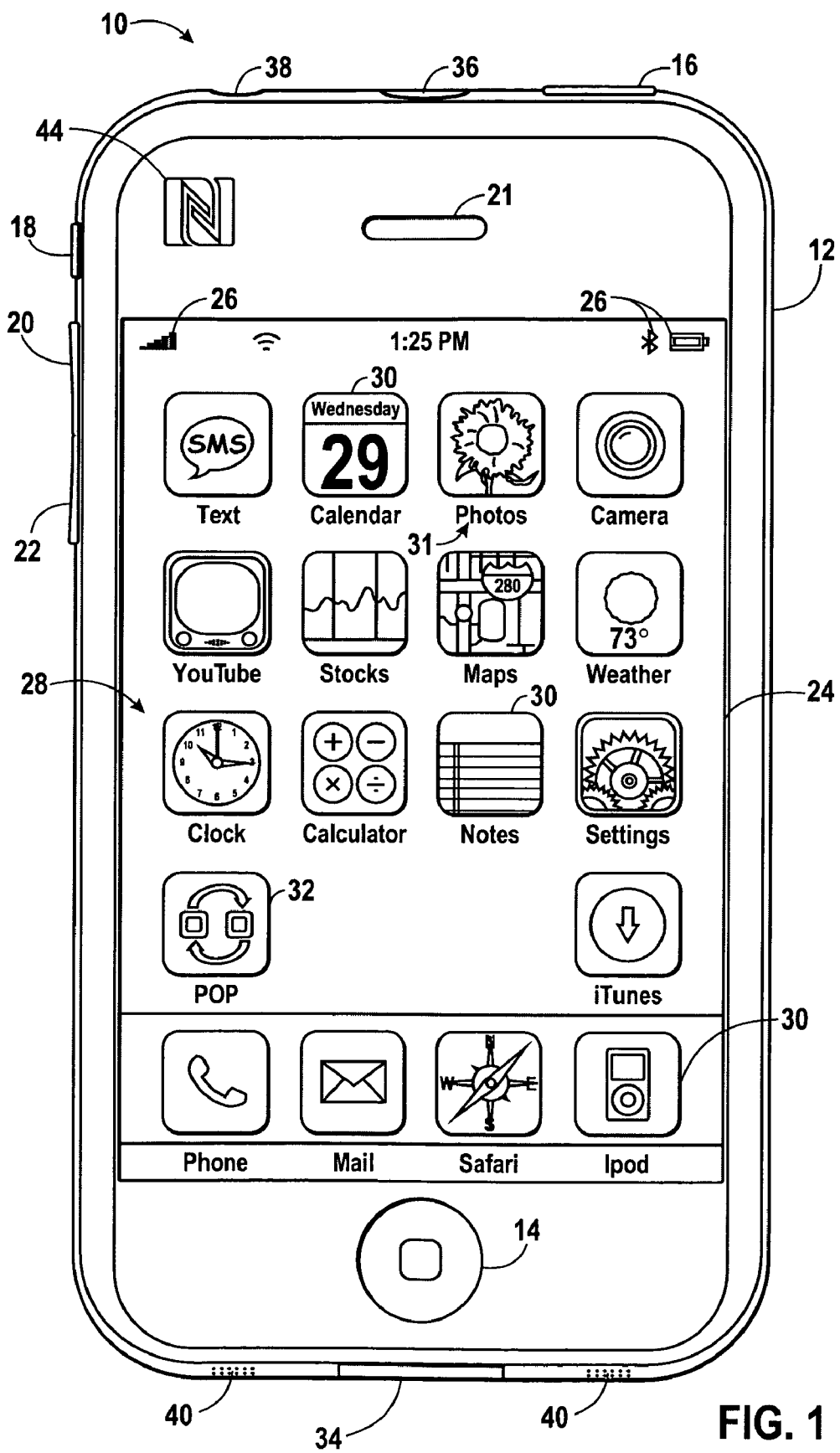
FIG. 1 is a front view of a portable electronic device in accordance with one embodiment.

FIG. 1 illustrates an electronic device 10 that may make use of the techniques for performing workflows as described above. As illustrated in FIG. 1, the electronic device 10 may be a handheld device incorporating the functionality of one or more portable devices, such as a media player, a cellular phone, a personal data organizer, and so forth. Depending, of course, on the functionalities provided by the electronic device 10, a user may scan articles of merchandise, listen to music, play games, record video, take pictures, and place telephone calls, while moving freely with the device 10. In addition, the electronic device 10 may allow a user to connect to and communicate through the Internet or through other networks, such as local or wide area networks. For example, the electronic device 10 may allow a user to communicate using e-mail, text messaging, instant messaging, or other forms of electronic communication. The electronic device 10 also may communicate with other devices using short-range connections, such as Bluetooth® and near field communication. By way of example, the electronic device 10 may be a model of an iPhone®, or a derivative thereof provided for sales transactions, available from Apple Inc. of Cupertino, Calif.

In the depicted embodiment, the device 10 includes an enclosure 12 that protects the interior components from physical damage and shields them from electromagnetic interference. The enclosure 12 may be formed from any suitable material such as plastic, metal or a composite material and may allow certain frequencies of electromagnetic radiation to pass through to wireless communication circuitry within the device 10 to facilitate wireless communication.

The enclosure 12 allows access to user input structures 14, 16, 18, 20, and 22 through which a user may interface with the device. Each user input structure 14, 16, 18, 20, and 22 may be configured to control a device function when actuated. For example, the input structure 14 may include a button that when pressed causes a "home" screen or menu to be displayed on the device. The input structure 16 may include a button for toggling the device 10 between a sleep mode and a wake mode. The input structure 18 may include a two-position slider that silences a ringer for the cell phone application. The input structures 20 and 22 may include buttons for increasing and decreasing the volume output of the device 10. In general, the electronic device 10 may include any number of user input structures existing in various forms including buttons, switches, control pads, keys, knobs, scroll wheels, or other suitable forms.

The device 10 also includes a display 24 that may display various images generated by the device. For example, the display 24 may show photos of merchandise, advertisements, movies, and/or data, such as text documents, work schedules, financial spreadsheets, text messages, and email, among other things. The display 24 also may display system indicators 26 that provide feedback to a user, such as power status, signal strength, call status, external device connection, and the like. The display 24 may be any type of display such as a liquid crystal display (LCD), a light emitting diode (LED) display, an organic light emitting diode (OLED) display, or other suitable display. Additionally, the display 24 may include a touch-sensitive element, such as a touch screen.

The display 24 may be used to display a graphical user interface (GUI) 28 that allows a user to interact with the device. The GUI 28 may include various layers, windows, screens, templates, elements, or other components that may be displayed in all, or a portion, of the display 24. Generally, the GUI 28 may include graphical elements that represent applications and functions of the device 10. The graphical elements may include icons and other images representing buttons, sliders, menu bars, and the like. In certain embodiments, the user input structure 14 may be used to display a home screen of the GUI 28. For example, in response to actuation of the input structure 14, the device may display graphical elements, shown here as icons 30, of the GUI 28. The icons 30 may correspond to various applications of the device 10 that may open upon selection of an icon 30. The icons 30 may be selected via a touch screen included in the display 24, or may be selected by user input structures, such as a wheel or button.

The icons 30 may represent various layers, windows, screens, templates, elements, or other components that may be displayed in some or all of the areas of the display 24 upon selection by the user. Furthermore, selection of an icon 30 may lead to a hierarchical navigation process, such that selection of an icon 30 leads to a screen that includes one or more additional icons or other GUI elements. Textual indicators 31 may be displayed on or near the icons 30 to facilitate user interpretation of each icon 30. It should be appreciated that the GUI 30 may include various components arranged in hierarchical and/or non-hierarchical structures.

When an icon 30 is selected, the device 10 may be configured to open an application associated with that icon and display a corresponding screen. For example, when the Workflow icon 32 is selected, the device 10 may be configured to open an application for performing a workflow. The application also may be used to create and/or customize workflows as well as setup of workflow preferences. For each application, screens including additional icons or other GUI elements may be displayed on the display 24.

The electronic device 10 also may include various input and output (I/O) ports 34, 36, and 38 that allow connection of the device 10 to external devices. The I/O port 34 may be a connection port for transmitting and receiving data files, such as media files or workflows. For example, the I/O port 34 may be a proprietary port from Apple Inc. The I/O port 36 may be a connection slot for receiving a subscriber identify module (SIM) card. The I/O port 38 may be a headphone jack for connecting audio headphones. In other embodiments, the device 10 may include any number of I/O ports configured to connect to a variety of external devices, including but not limited to a power source, a printer, a computer, and an intermediate device, such as a dock. In certain embodiments, multiple ports may be included on the device. The ports may be any interface type, such as a universal serial bus (USB) port, serial connection port, Firewire port (IEEE-1394), or AC/DC power connection port.

Further, in some embodiments, certain I/O ports may be configured to provide for more than one function. For instance, in one embodiment, the I/O port 34 may be configured to not only transmit and receive data files, as described above, but may be further configured to couple the device to a power charging interface, such as an power adaptor designed to provide power from a electrical wall outlet, or an interface cable configured to draw power from another electrical device, such as a desktop computer. Thus, the I/O port 34 may be configured to function dually as both a data transfer port and an AC/DC power connection port depending, for example, on the external component being coupled to the device 10 through the I/O port 34.

The electronic device 10 may also include various audio input and output structures 40 and 42. For example, the audio input structures 40 may include one or more microphones for receiving voice data from a user. The audio output structures 42 may include one or more speakers for outputting audio data, such as data received by the device 10 over a cellular network. Together, the audio input and output structures 40 and 42 may operate to provide telephone functionality. Further, in some embodiments, the audio input structures 40 may include one or more integrated speakers serving as audio output structures for audio data stored on the device 10. For example, the integrated speakers may be used to play music stored in the device 10.

The device 10 may further include a near field communication (NFC) device 44. The NFC device 44 may be located within the enclosure 12, and a mark or symbol on the exterior of the enclosure 12 may identify its location within the enclosure 12. The NFC device 44 may allow for close range communication at relatively low data rates (e.g., 424 kb/s), and may comply with standards such as ISO 18092 or ISO 21481, or it may allow for close range communication at relatively high data rates (e.g., 560 Mbps), and may comply with the TransferJet® protocol. In certain embodiments, the communication may occur within a range of approximately 2 to 4 cm. The close range communication with the NFC device 44 may take place via magnetic field induction, allowing the NFC device 44 to communicate with other NFC devices or to retrieve information from tags having radio frequency identification (RFID) circuitry. As discussed below, the NFC device 44 may be used to exchange information for initiating a workflow that may be performed on two or more electronic devices.

Figure 2:
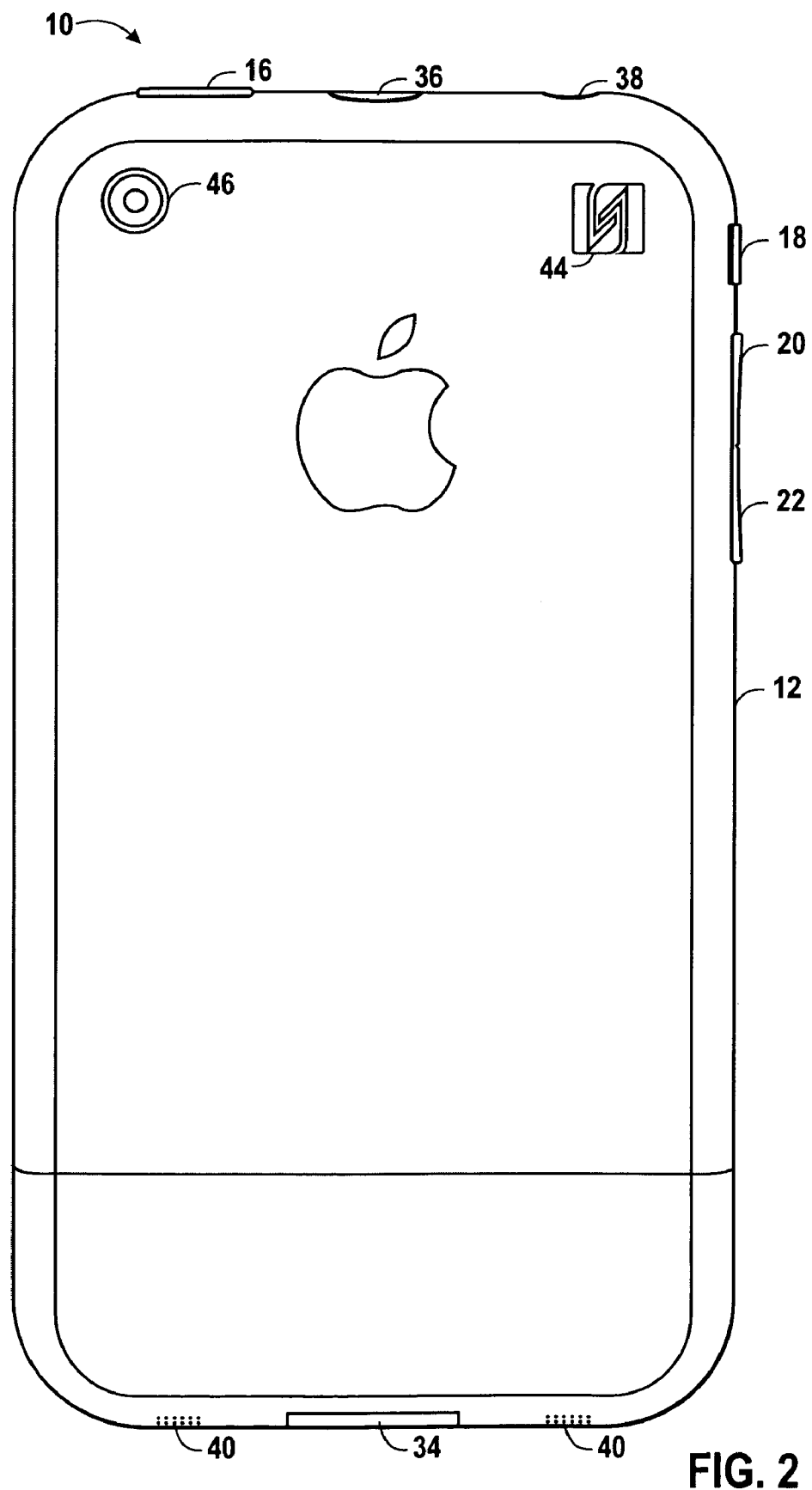
FIG. 2 is a rear view of the portable electronic device of FIG. 1 in accordance with one embodiment.

FIG. 2 illustrates the back of the electronic device 10. A camera 46 may be accessed from the back of the electronic device 10. Of course, the location of the camera 46 is provided for illustrative purposes. In other embodiments, the camera 46 may be accessed from the front or side of the device 10. The camera 46 may be used to capture images or video and may be used to obtain merchandise information or payment information. For example, the camera 46 may be used to capture an image of a person to store with that person's contact information. The camera 46 may be a 2.0 megapixel camera or other suitable camera and may operate in conjunction with image processing software stored within the electronic device 10.

Figure 3:
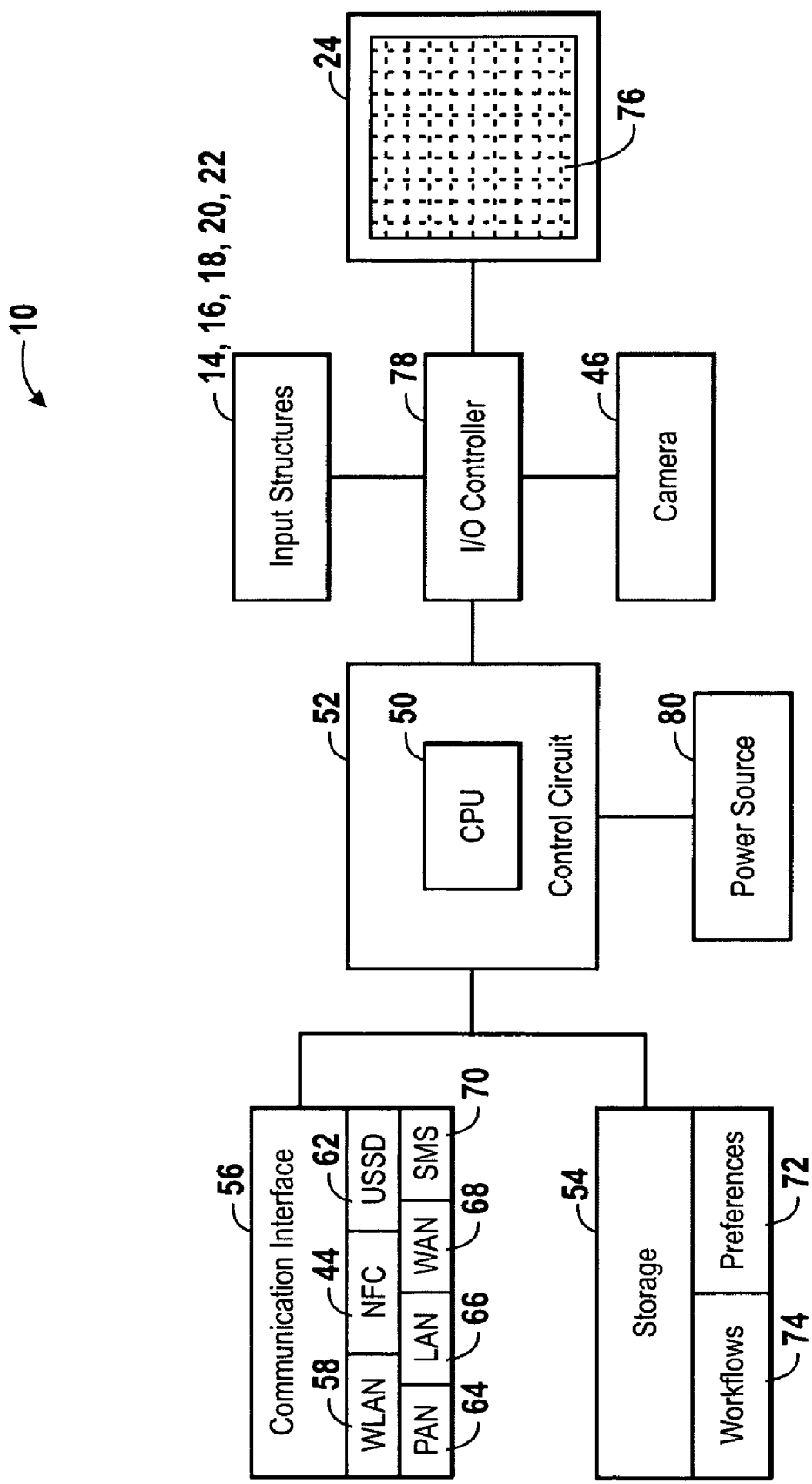
FIG. 3 is a simplified block diagram of the device of FIGS. 1 and 2 in accordance with one embodiment.

Additional details of the illustrative device 10 may be better understood through reference to FIG. 3, which is a block diagram illustrating various components and features of the device 10 in accordance with one embodiment of the present invention. The block diagram includes the display 24, the NFC device 44, the camera 46, and the input structures 14, 16, 18, 20, and 22 discussed above, as well as many other components.

The operation of the device 10 may be controlled by a central processing unit (CPU) 50 and a control circuit 52 that provide the processing capability required to execute the operating system, programs, GUI 28, and any other functions of the device 10. The CPU 50 may include a single processor or it may include a plurality of processors. For example, the CPU 50 may include "general purpose" microprocessors, a combination of general and special purpose microprocessors, instruction set processors, graphics processors, video processors, and/or related chips sets, and/or special purpose microprocessors. The control circuit 52 may include one or more data buses for transferring data and instructions between components of the device 10. The control circuit 52 also may include on board memory for caching purposes.

Information used by the CPU 50 may be located within long-term storage 54. The long-term storage 54 of electronic device 10 may be used for storing data required for the operation of the CPU 50 as well as other data required by the device 10. For example, the storage 54 may store the firmware for the electronic device 10 that is used by the CPU 50. The firmware may include an operating system, as well as other programs that enable various functions of the electronic device 10, GUI functions, and/or processor functions. The storage 54 also may store components for the GUI 28, such as graphical elements, screens, and templates. Additionally, the long term storage 54 may store data files such as media (e.g., music and video files), image data, software, preference information (e.g., media playback preferences), wireless connection information (e.g., information that may enable the device 10 to establish a wireless connection, such as a telephone connection), subscription information (e.g., information that maintains a record of podcasts, television shows or other media to which a user subscribes), telephone information (e.g., telephone numbers), and any other suitable data. The long-term storage 54 may be non-volatile memory such as read only memory, flash memory, a hard drive, or any other suitable optical, magnetic, or solid-state computer readable media, as well as a combination thereof.

One or more communication interfaces 56 may provide additional connectivity channels for receiving and transmitting information. The communication interface 56 may represent, for example, one or more network interface cards (NIC) or a network controller as well as associated communication protocols. The communication interface 56 may include several types of interfaces, including but not limited to, a wireless local area network (WLAN) interface 58, an unstructured supplementary service data (USSD) interface 62, a personal area network (PAN) interface 64, a local area network (LAN) interface 66, a wide area network (WAN) interface, a short message service (SMS) interface 70, and the NFC device 44.

The PAN interface 64 may provide capabilities to network with, for example, a Bluetooth® network, an IEEE 802.15.4 (e.g., ZigBee) network, or an ultra wideband network (UWB). As should be appreciated, the networks accessed by the PAN interface 64 may, but do not necessarily, represent low power, low bandwidth, or close range wireless connections. The PAN interface 64 may permit one electronic device 10 to connect to another local electronic device, such as a computer or portable media player, via an ad-hoc or peer-to-peer connection. However, the connection may be disrupted if the separation between the two electronic devices exceeds the range of the PAN interface 64.

The LAN interface 66 and WLAN interface 58 may provide longer-range communication channels, generally exceeding the range available via the PAN interface 64. The LAN interface 66 may represent an interface to a wired Ethernet-based network, and the WLAN interface 58 may represent an interface to a wireless LAN, such as an IEEE 802.11x wireless network. Additionally, in many cases, a connection between two electronic devices via the LAN interface 66 may involve communication through a network router or other intermediary device.

Connection to a wide area network (WAN) may be provided through the WAN interface 68. The WAN interface 68 may permit a connection to a cellular data network, such as the Enhanced Data rates for GSM Evolution (EDGE) network or the 3G network. When connected via the WAN interface 68, the electronic device 10 may remain connected to the Internet and, in some embodiments, to another electronic device, despite changes in location that might otherwise disrupt connectivity via the PAN interface 64 or the LAN interface 66.

In certain embodiments, the device 10 may use a device identification networking protocol to establish a connection with an external device through a network interface. For example, both the device 10 and the external device may broadcast identification information using Internet protocol (IP). The devices may then use the identification information to establish a network connection, such as a PAN connection or a LAN connection, between the devices. By way of example, the device identification protocol may be Bonjour® by Apple Inc.

Small size communications may be sent using the USSD interface 62 and the SMS interface 70. The SMS interface 70 may allow transmission of text messages of 140 bytes or less. In certain embodiments, larger size messages may be sent using concatenated SMS. The USSD interface 62 may facilitate the transmission of real-time text messages over GSM signaling channels. For example, the USSD interface 62 may be used to query inventory or price information for an article of merchandise.

Close range communication may occur through the NFC device 44. The NFC device 44 may exist as a separate component or may be integrated into another chipset, for example, as part of a system on a chip (SoC). The NFC device 44 may include one or more protocols, such as the Near Field Communication Interface and Protocols (NFCIP-1) for communicating with another NFC enabled device. The protocols may be used to adapt the communication speed and to designate one of the connected devices as the initiator device that controls the near field communication. In certain embodiments, the NFC device 44 may be used to receive information, such as the service set identifier (SSID), channel, and encryption key, used to connect through another communication interface 58, 64, 66, or 68.

The NFC device 44 may control the near field communication mode of the electronic device 10. For example, the NFC device 44 may be configured to switch the NFC device 44 between a reader/writer mode for reading NFC tags, a peer-to-peer mode for exchanging data with another NFC enabled device, and a card emulation mode for allowing another NFC enabled device to read information. The NFC device 44 also may be configured to switch between an active mode where the device 44 generates its own RF field and a passive mode where the device 44 uses load modulation to transfer data to another device generating a RF field. Operation in passive mode may prolong the battery life of the device 10. In certain embodiments, the modes of the NFC device 44 may be controlled based on user or manufacturer preferences 72.

The preferences 72 may be stored within the storage 54 and may be set by the device manufacturer or by a user through the GUI 28 (FIG. 1). The preferences 72 may determine properties of a communication interface 44, 56, 58, 62, 64, 66, 68, and 70. For example, the preferences 72 may include a list of networks to which the device 10 may connect. In another example, the preferences 72 may specify the mode of the NFC device 44. For example, the NFC device 44 may operate in a passive mode unless the Workflow application is running.

The preferences 72 also may govern operation of workflows 74 stored within the storage 54. As noted above, the workflows 74 may define a series of actions that may be performed by the initiator device 10 and another electronic device acting as a target device. For example, a workflow for adding contacts may include the actions of obtaining contact information, storing the contact information, capturing a picture of the contact person, and receiving a bookmark for the contact person's personal webpage. The workflows may define any group of actions capable of performance by the initiator device 10, including, but not limited to, capturing pictures, transmitting and receiving notes, texts, emails, and data files, obtaining and sending contact information by exchanging electronic business cards, and synchronizing calendars, among others.

A workflow 74 may be initiated through selection of the workflow 74 through the GUI 28 (FIG. 1). In certain embodiments, a workflow 74 also may be initiated upon detecting a near field communication link with a specific target device. For example, spouses may want to synchronize family calendars on a daily or weekly basis. One spouse's cell phone may function as the initiator device 10 and the other spouse's cell phone may function as the target device. Upon detecting a near field communication link with the target device, the initiator device 10 may initiate a workflow for synchronizing the family calendars stored on each device. The preferences 72 may be used to specify device identifiers for cell phones, media players, computers, and other electronic device, that when detected by near field communication may initiate a workflow. The preferences 72 also may be used to specify which workflow is initiated upon detecting a specific device.

The preferences 72 also may include properties specifying the data that should be used for workflow actions. The properties may specify the type of data, for example, the file format, the period of data, for example, data created within the past week, and the amount of data, for example, the five most recent lists created on the device. In a specific example, a user may only wish to synchronize calendar appointments for the next week. In this example, the preferences may be used to specify that a workflow for synchronizing calendars should only synchronize data for the upcoming week.

In certain embodiments, the preferences may be included in or added to workflow scripts associated with a workflow 74. The workflow scripts may include code that may enable the target device to perform actions in the workflow even though a workflow or application is not installed on the target device. For example, a workflow script may include code for adding a contact as a friend on a social networking site. The workflow script also may prompt the target device to perform certain functions, such as connecting to the Internet or opening a camera application.

Information received through the communication interface 56, as well as information contained in the storage 54, may be displayed on the display 24. As noted above, a user may select information to display through the GUI 28 (FIG. 1). A touch screen 74 may be positioned in front of or behind the display 24 and may be used to select graphical elements, such as the icons 30 (FIG. 1), shown on the display 24. The touch screen 54 is configured to receive input from a user's or object's touch and to send the information to the CPU 50, which interprets the touch event and performs a corresponding action. The touch screen 76 may employ any suitable type of touch screen technology such as resistive, capacitive, infrared, surface acoustic wave, electromagnetic, or near field imaging. Furthermore, the touch screen 76 may employ single point or multipoint sensing.

An input/output (I/O) controller 78 may provide the infrastructure for exchanging data between the control circuit 52 and the input/output devices, such as the touch screen 76, the camera 46, and the display 24. The I/O controller 78 may contain one or more integrated circuits and may be integrated within the control circuit 52 or exist as a separate component. The I/O controller 78 also may provide the infrastructure for communicating with external devices through the I/O ports 34, 36, and 38 shown in FIG. 1 and may be used for connecting the device 10 to an external computer, a printer, audio headphones, or the like. The I/O controller 78 also may provide the infrastructure for communicating with the CPU 50 through the input structures 14, 16, 18, 20, and 22. The user input structures 14, 16, 18, 20, and 22 may be used in conjunction with, or independently of, the touch screen 76 to select inputs for the device 10.

The device 10 may be powered by a power source 80 that may include one or more batteries and, or alternatively, and AC power source, such as provided by an electrical outlet. In certain embodiments, the device 10 may include an integrated power source that may include one or more batteries, such as a Li-ion battery, which may be user-removable or secured to the enclosure 12. In certain embodiments, the proprietary connection I/O port 34 may be used to connect the device 10 to a power source for recharging the battery.

FIG. 4 illustrates a workflow exchange that may be performed with the initiator device, represented as 10A, and a target electronic device 10B. The workflow may be performed in a wide variety of environments, such as a within a store, within a school, within or home, or within any environment that the initiator device 10A may be located within or transported to. As show in FIG. 4, a user 82 is operating the initiator device 10A within a retail store and has encountered another person 84 operating the target device 10B. The user 82 and other person 84 may bring their respective electronic devices 10A and 10B in close proximity to each other to establish a communication link 88 for performing a workflow exchange. For example, the user 82 and other person 84 may wish to exchange contact information through their respective electronic devices 10A and 10B. The user 82 may select a workflow on his electronic device 10A to initiate a series of actions that may include, for example, sending the user's contact information to the target device 10B, and receiving the other person's contact information from the target device 10B. Upon completion of the workflow, the initiator device 10A may have contact information for the other person 84 stored in an electronic address book and the target device 10A may have contact information for the user 82 stored in an electronic address book.

The communication link 88 may represent a close range communication link, such as near field communication link or a PAN communication link. In certain embodiments, the devices 10A and 10B may perform the entire workflow over the communication link 88. However, in other embodiments, the communication link 88 may be used to exchange initial workflow properties and network configurations for establishing another communication link, such as a wireless network connection for completing the workflow.

The initiator device 10A may include one or more workflows that may be used to perform a variety of actions using the initiator device 10A and the target device 10B. To perform a workflow, the initiator device 10A may transmit a workflow script containing instructions for the target device 10B to the target device 10B. The exchange of a workflow script is described in detail below with respect to FIG. 5. The workflow script may enable the target device 10B to execute actions of the workflow. For example, as shown in FIG. 4, the user 82 and the other person 84 may execute a workflow to exchange contact information. In this example, the initiator device 10A may send a workflow script to the target device 10B that instructs the target device 10B to perform the following actions: retrieve contact information for the other person 84, transmit the contact information to the initiator device 10A, and store contact information for the user 82 in an electronic address book of the target device 10B. The workflow also may instruct the initiator device 10A to perform the following actions: retrieve contact information for the user 82, transmit the contact information to the target device 10B, and store contact information for the other person 84 in an electronic address book of the initiator device 10A.

In another example, a workflow may be used in a home environment to transfer a shopping list between a housekeeper and employer. For example, the employer may generate a shopping list and dinner menu on her electronic device 10A and execute a workflow to send this information to the housekeeper's target electronic device 10B. The workflow also may include a script that instructs the target device 10B to send notification that the list was received and to transmit a note stored on the target device 10B to the employer's initiator device 10A. For example, the target device 10B may transmit a note requesting days off to the initiator device 10A.

In yet another example, a workflow may be used in the school environment to turn in homework and receive the next homework assignment. For example, a professor may have an initiator device 10A, such as a desktop computer, that performs a workflow to obtain completed homework assignments from students' electronic devices 10B, such as laptop computers or portable media players. The workflow also may transmit the next homework assignment to the students' electronic devices 10B.

Of course, these examples are not intended to be limiting and are provided by way of example only. Workflows may be used to perform any number and type of actions, such as synchronizing calendars, taking pictures, transferring media files and playlists, and combinations thereof. Further, the initiator and target devices may represent portable devices, such as portable media players, laptop computers, cellular telephones, and personal data assistants, as well as other types of electronic devices, such as desktop computers and digital video recorders.

FIG. 5 illustrates communications 90 that may occur between the initiator device 10A and the target device 10B when performing a workflow. As shown, the target device 10B represents a multimedia device, such as an iPod® Touch commercially available from Apple Inc., and the initiator device 10A represents a handheld multi-function device, such as an iPhone® available form Apple Inc. However, in other embodiments, the target device 10B and the initiator device 10A may be other types of electronic devices including, but not limited to, computers, personal data assistants, digital video recorders, or other types of electronic devices.

The workflow may be initiated through the close range communication link 88. To establish the communication link 88, handshake information 94 may be transferred between the initiator device 10A and the target device 10B. The handshake information 94 may include properties such as device identifiers and connectivity information that may be used to connect the devices 10A and 10B. For example, the communication link 88 may represent a near field communication link established between the NFC device 44A of the initiator device 10A and an NFC device 44B of the target device 10B. In this example, the initiator device 10A may exist in an active mode, generating a radio field and periodically emitting a ping message to find devices within its range. In response to receiving a ping message, the target device 10B may transmit an acknowledgment message. The acknowledgment message, as well as subsequent communications, may occur while the target device 10B is in passive mode by using load modulation to transfer data between the devices 10A and 10B. However, in other embodiments, the target device 10B may enter an active mode in response to the ping message and generate its own radio field for transferring data between the devices 10A and 10B. As will be appreciated, in other embodiments, the initiator device 10A may remain in a passive mode while the target device 10B initiates communication while in an active mode. In certain embodiments, the initiator device 10A may be configured to enter the active mode in response to selection of the workflow icon 32 (FIG. 1).

In certain embodiments, the handshake information may include a device identifier in addition to the ping and acknowledgment messages. For example, the target device 10B may transmit a device identifier, such as a device identification number, serial number, or name, that may be recognized by the electronic device 10A to initiate a workflow. The device identifier may be transmitted using extensible markup language (XML) or other suitable specification language. The initiator device 10A may compare the received device identifier to device identifiers stored within the device 10A and select a workflow based on the received device identifier. In certain embodiments, the preferences 72 (FIG. 3) may be used to associate one or more workflows with the stored device identifiers.

After the communication link 88 is established using the handshake information 94, the initiator device 10A may transmit workflow properties 96 to the target device 10B. The workflow properties 96 may include information describing the workflow, such as the functions performed by the workflow, the applications used by the workflow, and the device inputs employed by the workflow, among other things. The workflow properties 96 may be used to verify and/or ascertain the functionality of the target device 10B. For example, the initiator device 10A may query the target device 10B to determine whether the target device 10B has a camera.

In response to receiving the workflow properties 96, the target device 10B may transmit target properties 98 to the initiator device 10A that describe the functionality of the target device 10B. For example, the target properties may specify the operating system for the target device 10B, the applications present on the target device 10B, the drivers installed on the target device 10B, the workflows included on the target device 10B, and the inputs present on the target device 10B. The workflow properties 96 and the target properties 98 may generally include short messages in extensible markup language (XML) or any other form. In certain embodiments, the target properties 98 may be used to determine instructions for the workflow.

The devices 10A and 10B also may exchange network properties 100. The network properties 100 may be used by the initiator device 10A to determine a subsequent communication link 102 for performing the workflow. In certain embodiments, the communication link 102 may represent a longer-range communication link capable of faster data transfer rates than the close range communication link 88. The network properties 100 may include, for example, XML messages denoting networks accessible by the target device 10B and denoting configuration information for connecting to the networks. Among other things, the network properties 100 may include known authorization keys, channels, and service set identifiers (SSID). The network properties 100 also may identify the network to which the target device 10B is currently connected.

If the longer-range communication link 102 is established, the rest of the workflow may be performed using this communication link 102. However, in certain environments, the longer-range communication link 102 may not be available, and the close range communication link 88 may be used to perform the workflow. Regardless of the communication link 88 or 102 used, the workflow actions may be initiated when the device 10A receives a workflow acceptance 104. The target device 10B may transmit the workflow acceptance 104 to the initiator device 10A to indicate that the target device 10B has authorized the workflow. For example, the workflow acceptance 104 may include a short XLM acceptance message transmitted in response to an acceptance input by the operator of the target device 10B.

In response to receiving the workflow acceptance 104, the device 10A may retrieve and transmit a workflow script 106. For example, the workflow script may be retrieved and/or generated based on the target properties 98. In certain embodiments, the workflow script 106 may be retrieved from the storage 54 (FIG. 1) and customized to include only functions that the device 10B is capable of executing. For example, if the target properties 98 indicate that the target device 10B does not have a camera, the CPU 50 (FIG. 3) may remove the steps for taking a picture from the workflow script 106. The workflow script 106 also may be customized based on the preferences 72 stored within the initiator device 10. For example, the preferences 72 may specify that certain actions should not be performed in any workflow. In this example, the CPU 50 (FIG. 3) may remove portions of the workflow script 106 that describe the specified actions.

The workflow script 106 may include code written in a scripting programming language, such as Python, Perl, JavaScript, or Ruby, among others. The workflow script 106 may be executed by the target device 10B to perform functions of the workflow. For example, the script 106 may instruct the device 10B to transmit contact information, such as a vCard (Versitcard), to the initiator device 10A. This information may be transmitted as workflow data 108. The workflow data 108 also may include information transmitted from the initiator device 10A to the target device 10B. For example, the initiator device 10A also may transmit contact information in the form on vCard to the target device 10B. The workflow data 108 may represent contact information, images, playlists, notes, files, and other types of data transmitted between the devices 10A and 10B to complete actions within the workflow. For example, the device 10A may store a vCard received as workflow data 108 in an electronic address book to complete a workflow for adding contact information. After all of the workflow data 108 has been exchanged and the devices 10A and 10B have performed any additional actions, such as displaying or storing the data, the workflow may be complete.

Figure 6:
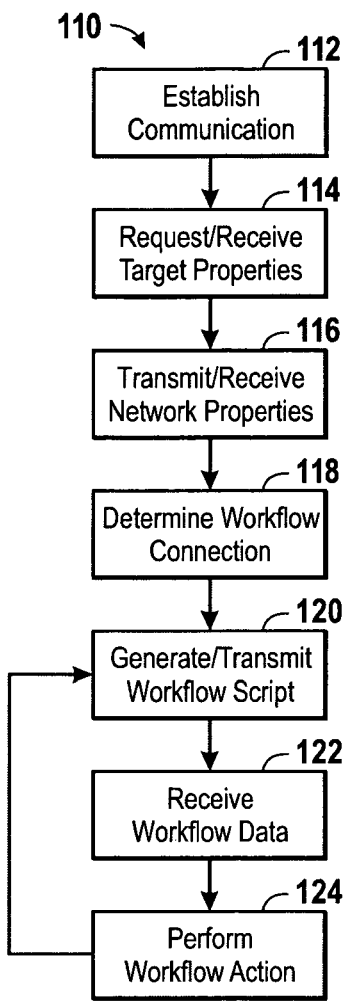
FIG. 6 is a flowchart depicting a method for performing a workflow in accordance with one embodiment.

FIG. 6 is a flowchart depicting an exemplary method 110 for performing a workflow as illustrated in FIG. 5. The method may begin by establishing (block 112) a communication link 88 (FIG. 5) between two electronic devices. For example, the communication link 88 may be established by executing a near field communication handshake or by connecting devices over a PAN. After communication has been established, the initiator device 10A may request and receive (block 114) properties 98 (FIG. 5) of the target device 10B. As noted above, the target properties 98 may denote capabilities of the target device 10B by indicating the applications, drivers, operating systems, and device installed on the target device 10B. The initiator device 10A may then transmit and receive (block 116) network properties 100 (FIG. 5) that may be used to establish the longer-range communication link 102. Based on the network properties 100, the initiator device 10A may determine (block 118) the longer-range communication link 102 for performing the rest of the workflow. As noted above with respect of FIG. 5, where a longer-range communication link 102 is unavailable or undesired, the close range communication link 88 may be used to perform the rest of the workflow. The process for determining the longer-range communication link 102 is described in detail below with respect to FIGS. 8 and 9.

The initiator device 10A may then perform the rest of the workflow using the longer-range communication link, which in certain embodiments may be a Wi-Fi network connection, a LAN connection, or a WAN connection. The initiator device 10A may generate and transmit (block 120) the workflow script to the target device 10B. As noted above, the workflow script may include code that allows the target device 10B to perform functions of the workflow, such as taking pictures, transmitting contact information, or transmitting files or notes stored on the target device. The workflow script may be executed by the target device 10B to generate and/or retrieve data for the workflow. For example, the workflow data may include contact information, a picture, or a file, among other things. The workflow data may be transmitted over the longer-range communication link 102 to be received (block 122) by the initiator device 10A. The initiator device 10A may then perform (block 124) a workflow action. For example, the initiator device 10A may store contact information, received as workflow data 108 (FIG. 5), in an electronic address book of the initiator device 10A. If additional actions are present in the workflow, the initiator device 10A may again generate and transmit (block 120) a workflow script. For example, in the add contact workflow, the initiator device 10A may first receive and store contact information and then generate a workflow script for joining a social networking page of the contact. However, in other embodiments, the initiator device 10A may generate and transmit a workflow script for performing all of the actions included in the workflow. In these embodiments, no additional generation and transmission may be required, and, therefore, the initiator device 10A may only repeat blocks 122 and 124 for the additional workflow actions.

FIGS. 7-17 further illustrate methods of performing workflows using the initiator device 10A. Many of these figures illustrate various screens that a user of the initiator device 10A may encounter while performing the workflows. The screens may be part of the GUI 28 (FIG. 1) and may be navigated using the touch screen 76 (FIG. 3) or the user input structures 14, 16, 18, 20, and 22 (FIG. 1) of the initiator device 10A. As will be appreciated, the functionality described may be achieved with a wide variety of graphical elements and visual schemes. Therefore, the screens shown in the following figures are not intended to be limiting. Other embodiments may include a large variety of user interface styles and the precise user interface conventions shown herein are provided by way of example only.

Figure 7:
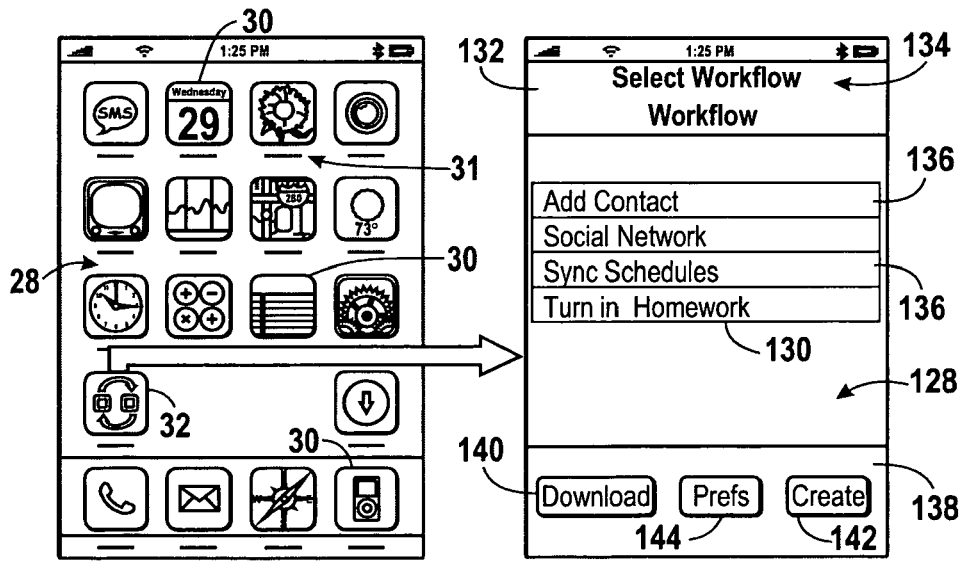
FIG. 7 is a front view of screens of the device of FIG. 1 illustrating a workflow application in accordance with one embodiment.

FIG. 7 illustrates screens that may be included within the workflow application. A screen 128 may serve as the main menu for performing and customizing the workflows. The main menu screen 128 may be accessed through selection of the workflow icon 32, shown on the home screen for the initiator device 10A, as generally indicated by the arrow. However, in other embodiments, the screen 128 may be displayed in response to detection of a close range communication link 88 (FIG. 5) established with another electronic device 10B. The screen 128 includes a display window 130 that displays the workflows stored within the initiator device 10A. A title bar 132 contains instructions 134 that prompt a user to selected one of the workflows shown within the display window 130. Each workflow is represented by a selection bar 136 that may be selected by a user through the GUI 28 (FIG. 1) to initiate the corresponding workflow.

Each workflow may represent a series of actions that may be performed in response to selection of the workflow. For example, the workflow "Add Contact" may be used to exchange contact information with another person. The actions may include exchanging electronic business card information and taking and storing a picture of the newly acquired contact. The "Social Network" workflow may include a series of actions for adding someone as a friend on a social networking site, such as Facebook, MySpace, or LinkedIn. The actions may include navigating to the social networking site, entering the user's password, entering the contact information for the desired friend, and confirming a friend request. The actions also may include sending code to the target electronic device 10B to instruct the target device 10B to access the same social networking site and request that the user be added as a friend.

The "Sync Schedules" workflow may include a set of actions for synchronizing calendars included on the initiator device 10A and the target device 10B. For example, the initiator device 10A may transmit calendar entries to the target device 10B along with a workflow script instructing the target device 10B to place the entries on an electronic calendar stored within the target device 10B. The workflow script also may instruct the target device 10B to send calendar entries to the initiator device 10A. The "Turn In Homework" workflow may include a series of actions for obtaining completed homework assignments from a student's electronic device. For example, the initiator device 10A may send a workflow script to the students' electronic device 10B that designates a file folder where the homework should be stored and instructs the student's device 10B to transmit the homework file to the initiator device 10A. The initiator device 10A may then transmit a new homework assignment to the student's device 10B. Of course, many other types of workflows may be envisioned and included on the main menu screen 128.

The screen 128 also includes a lower summary bar displaying graphical elements 140, 142, and 144 that may be selected to workflow related functions. The graphical element 140 may be selected to access a web service for downloading workflows. For example, the workflows may be provided by an electronic device manufacturer or by a third party service provider and may be available on a web service application such as iTunes®. The download process is described further below with respect to FIGS. 12 and 13. The graphical element 142 may be selected to create a new workflow. For example, the device may include a menu listing a series of actions that may be combined and prioritized by a user to generate new workflows. The workflow creation process is described further below with respect to FIGS. 14 and 15. The graphical element 144 may be selected to customize preferences related to performance of the workflows. For example, the preferences may determine when workflows are performed. In certain embodiments, workflows may be performed automatically upon detecting a device identifier for a specific target device. However, in other embodiments, the user may set the preferences so that a workflow must be authorized before it is initiated. The workflow preferences are described further below with respect to FIGS. 16 and 17.

Figure 8:
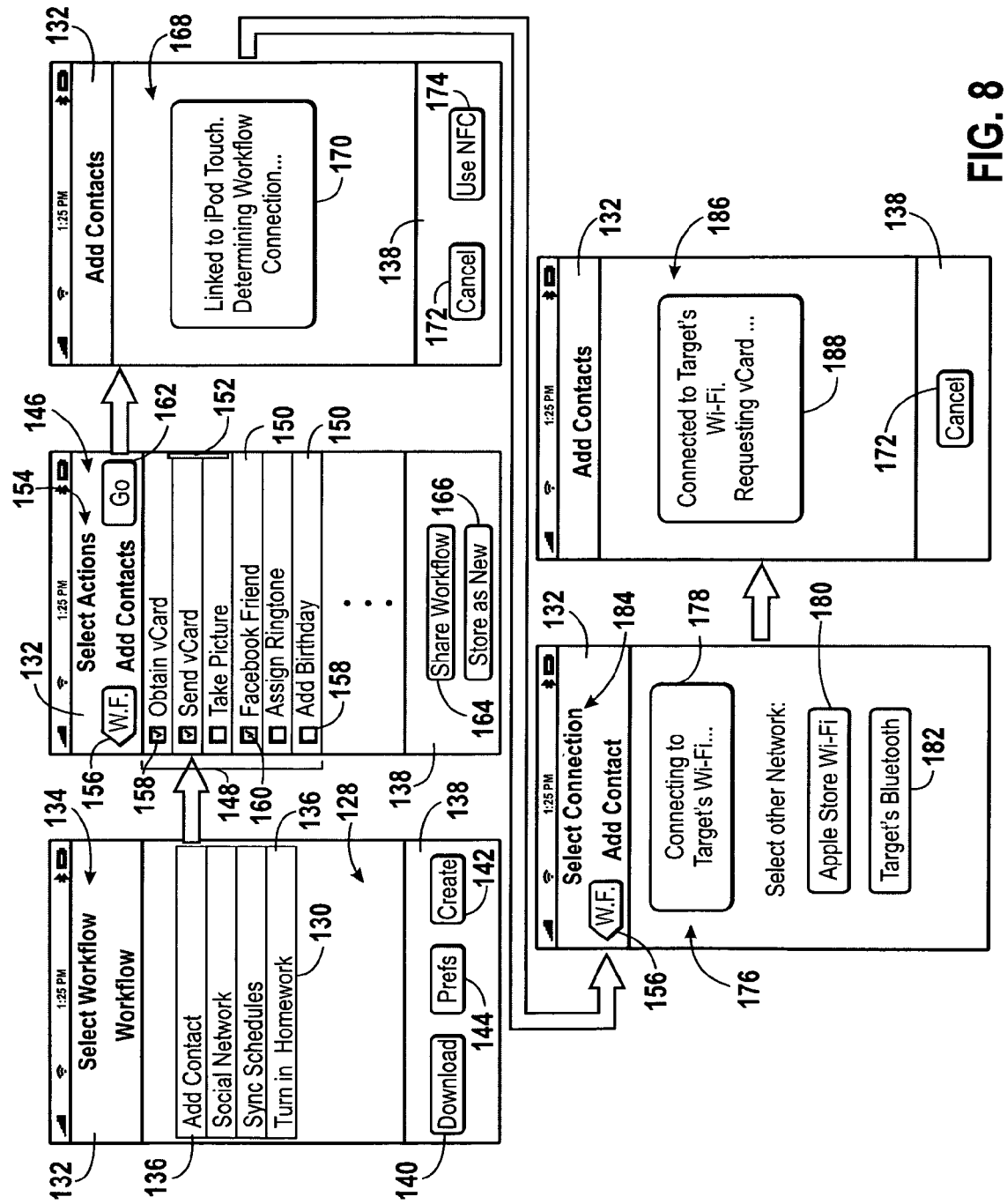
FIG. 8 is a front view of screens of the device of FIG. 1 illustrating a method of performing a workflow in accordance with one embodiment.

FIG. 8 illustrates a series of screens for initiating a workflow. The device 10A may initiate a workflow when a corresponding selection bar 136 is selected from the workflow main menu screen 128. However, in other embodiments, the preferences also may be set to allow automatic initiation of a workflow in response to detecting communication with a specific device. Selection of a selection bar 136 may display a list of actions included in a corresponding workflow.

Specifically, in response to selection of the "Add Contact" selection bar 136, the device 10A may display a screen 146. The screen 146 includes a display area 148 that list the actions included in the "Add Contact" workflow. Each action is listed in a corresponding selection bar 150 that may be selected to display details about the action. For example, the details for the "Add Birthday" action may specify that the action includes requesting a birth date from the target device and then adding that birth date to the contact name associated with the target device. The action also may include placing the birth date on an electronic calendar included in the initiator device 10A. A scroll bar 152 may be used to scroll through the display area 148 of the screen 146 and may be used to view selection bars 152 not currently shown on the screen 146.

Instructions 154 within the title bar 132 prompt the user to select actions for the workflow. If after reviewing the displayed actions, a user no longer wished to perform that workflow, the user may select a graphical element 156 to return to the main menu screen 128. However, if the user wishes to perform the workflow, the user may customize the actions within the workflow by selecting section boxes 158. The selection boxes 158 may include an indication 160, shown here as a check mark, that indicates that the action has been selected for inclusion in the workflow. In certain embodiments, the screen 146 may initially display each selection box 158 with an indication 160. A user may then select a section box 158 to remove the indication 160 and to remove the corresponding action from the current execution of the workflow. If no indication is present within a selection box 158, the user may select the selection box 158 to add the indication 160 and to add the corresponding action to current execution of the workflow.

The indications 160 identify the corresponding actions that are included in the current execution of the workflow. For example, as shown, the "Add Contact" workflow will perform the actions of obtaining a vCard, taking a picture, and adding the contact as a Facebook friend. The user has deselected the actions for sending a vCard, assigning a ring tone, and adding a birthday. Therefore, these actions will not be included when the workflow is performed. In other embodiments, the workflows may not be customizable and therefore the selection boxes for adding or removing actions may be omitted.

After all of the actions have been selected, the user may select a graphical element 162 to perform the actions included in the workflow. The user may also select a graphical element 164 to share the workflow with another person. For example, a user of a target device 10B may wish to have a workflow that was performed on the target device 10B. The user of the initiator device 10A may select the graphical element 164 to display a series of screens for downloading the workflow to the target device 10B. In certain embodiments, the device manufacturer or company providing the workflow may receive a fee each time a workflow is shared with a new user.

The graphical element 166 may be selected to store the customized workflow as a new workflow. For example, selection of the graphical element 166 from the screen 146, as shown in FIG. 8, may create a new workflow that includes the actions of obtaining a vCard, taking a picture, and adding the contact as a Facebook friend. The new workflow may be stored within the storage 54 (FIG. 1) as a new workflow 74 (FIG. 3).

To perform the actions selected on the screen 146, a user may select the graphical element 162. In response to selection of the graphical element 162, the initiator device 10A may establish the communication link 88 and transmit the workflow properties 96, acquire the target properties 98, and exchange the network properties 100, as shown in FIG. 5. For each of these steps, the device 10A may display screens indicating the status of the workflow. For example, the device 10A may display a screen 168 that includes a display window 170 indicating that the device 10A has established a communication link 88 with the target device 10B, represented on the screen 168 as an iPod® Touch. The display window 170 also may display the action currently being performed, such as transmitting the workflow properties, acquiring the target properties, or exchanging the network properties. The display window 170 may be updated with new messages as each action is completed by the device 10. For example, a shown in FIG. 8, the initiator device 10A is currently determining the workflow communication link 88 or 102 (FIG. 5) and, therefore, a corresponding message is displayed within the display window 170.

The lower summary bar 138 includes two graphical elements 172 and 174 for manipulating execution of the workflow. Specifically, the graphical element 172 may be selected to cancel performance of the workflow. The graphical element 174 may be selected to specify that the workflow communication link 88 or 102 should be a near field communication link. For example, when a user is aware that no other communication links are available or when a user desires a near field communication link, for example, for security reasons, the user may wish to transmit the workflow data 108 (FIG. 5) using the near field communication link 88 (FIG. 5). In these situations, the user may select the graphical element 174 to cancel the device-initiated determination of a longer-range communication link and to select the near field communication link 88 for conducting the workflow. However, if a user takes no action, the device 10A may automatically determine and select a longer-range communication link 102 (FIG. 5).

The device may display the network connection status on a screen 176 that includes a display window 178 describing the longer-range communication link 102 (FIG. 5). For example, the window 178 indicates that the initiator device 10A is connecting to a Wi-Fi network to which the target device 10B is currently connected. The screen 176 also includes display windows 180 and 182 that show other available communication links that maybe used to perform the workflow. For example, the device 10A has detected that a Wi-Fi connection is available from an Apple store and that a Bluetooth® connection is available through the target device 10B. A user may select these display areas 180 and 182 to connect to the target device 10B through one of these networks instead of through the network shown in the display window 178. Instructions 184 prompt the user to select a network for the longer-range communication link 102 (FIG. 5). However, if no network is selected, the device 10A may connect to the network shown within the display window 178, shown here as a Wi-Fi network to which the target device is connected.

When a longer-range communication link has been established, the device 10A may display a screen 186 with a display window 188 indicating the successful connection. The display window 188 also may display the status of the workflow actions. For example, as shown, the device 10A is currently requesting a vCard form the target device 10B. As noted above, the user may select the graphical element 172 to cancel or interrupt the workflow.

Figure 9:
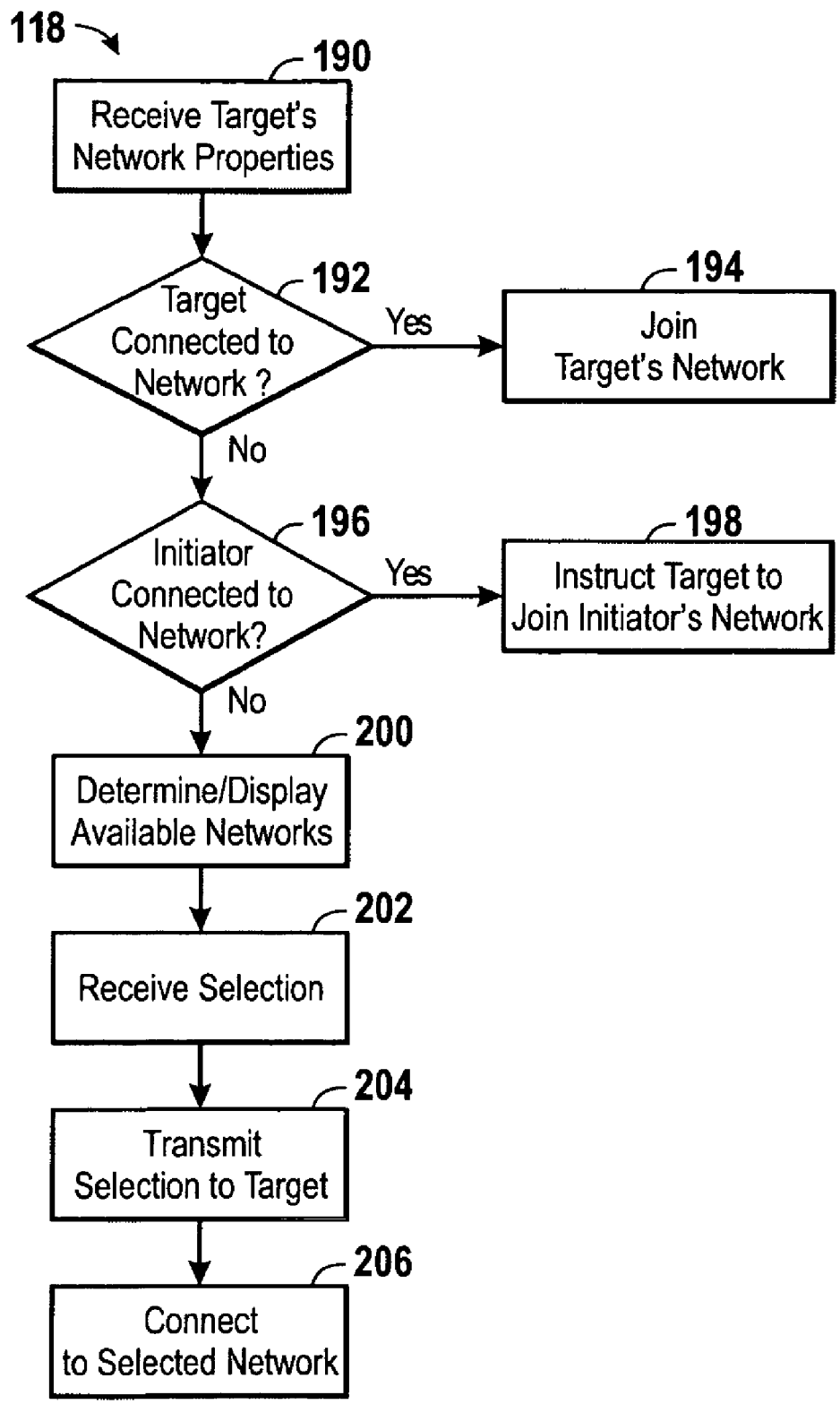
FIG. 9 is flowchart depicting a method for determining a workflow connection network in accordance with one embodiment.

FIG. 9 is a flowchart depicting an exemplary method 118 for determining a workflow connection as indicated generally by the block 118 shown in FIG. 6. While executing the method 118, the initiator device 10A may display the screens illustrated in FIG. 8. The method may begin by receiving (block 190) the network properties from a target device. The network properties may include, for example, XML messages denoting information for a network that the target device 10B is currently operating on. For example, if the target device 10B is operating on a local area network, the properties may include a Wi-Fi IP address, an authorization key, and an SSID for the network. If the target device 10B is not connected a network, the XML messages may indicate the network communication interfaces included on the target device 10B.

Based on the network properties, the initiator device 10A may determine if the target device 10B is connected to a network (block 192). If the target device 10B is connected to a network, the initiator device 10A may join (block 194) the same network as the target device 10B. For example, the initiator device 10A may use the SSID and authorization key provided with the network properties to establish a network connection. If the target device 10B is not connected to a network, the initiator device 10A may determine (block 196) whether the initiator device 10A is connected to a network. For example, the initiator device 10A may be operating on a Wi-Fi network available through a Wi-Fi hot spot. In this example, the initiator device 10A may instruct (block 198) the target device 10B to join the same network as the initiator device 10A. The initiator device 10A may transmit, for example, XML messages containing the network configuration information, such as the authorization key, channel, and SSID. The XML messages may be transmitted through the close range communication link 88 (FIG. 5).

If the initiator device 10A is not connected to a network, the initiator device 10A may determine and display (block 200) available networks. For example, the available networks may be displayed within the display windows 180 and 182, shown on the screen 176 in FIG. 8. The initiator device 10A may then receive a user selection specifying one of the displayed networks. In other embodiments, the initiator device 10A may select one of the available networks based on the preferences 72 (FIG. 3). After receiving (block 202) a network selection, the initiator device 10A may transmit (block 204) information describing the selected network to the target device 10B. The information may and may be transmitted over the close range communication link 88 (FIG. 5) using, for example, XML messages. In certain embodiments, the information may include network configuration information such as the authorization key and SSID for enabling the target device 10B to connect to the selected network. The initiator device 10A may then connect to the selected network (block 206). In certain embodiments, the initiator device 10A may also confirm that the target device 10B successfully connected to the selected network.

Figure 10:
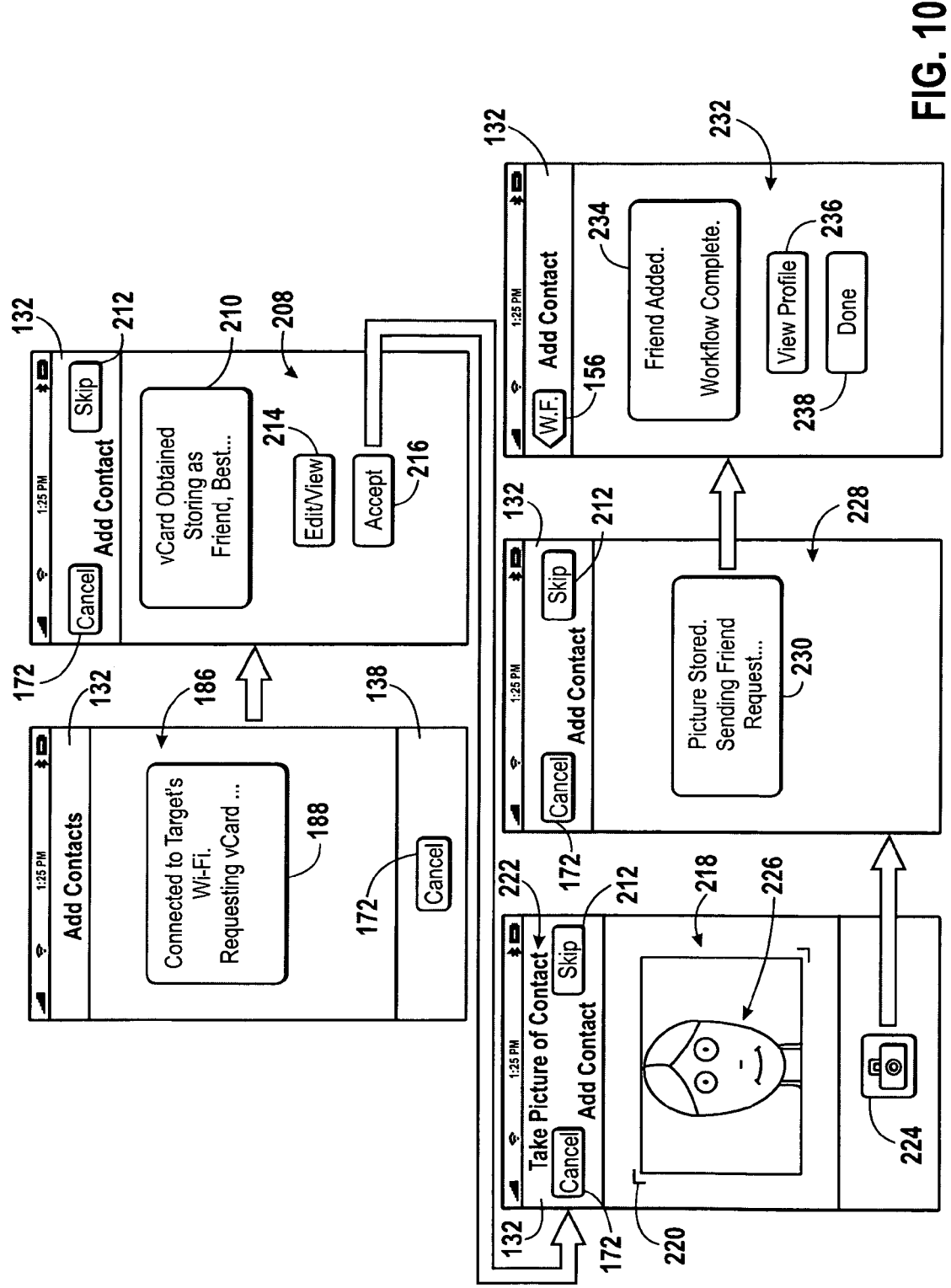
FIG. 10 is a front view of screens of the device of FIG. 1 illustrating a method of performing a workflow for adding a new contact in accordance with one embodiment.

After the network connection 102 (FIG. 5) has been established, the workflow actions may be performed. FIG. 10 illustrates a series of screens for performing an exemplary workflow for adding a contact. As shown on the screen 146 of FIG. 8, the "Add Contact" workflow includes the actions of obtaining a vCard, taking a picture of the contact person, and adding the contact person as a Facebook friend. As noted above, the first action, requesting a vCard, may occur automatically after the initiator device determines a workflow network connection. However, in other embodiments, a user may need to approve the workflow network connection before the initiator device 10A performs the first action in the workflow.

After the first action has been performed, the initiator device 10A may display a screen 208 indicating the status of the first action, obtaining a vCard. The screen 208 includes a display window 210 that shows a message indicating that the vCard has been obtained. Of course, if the initiator device 10A is unable to perform an action, the initiator device 10A may display an error message notifying the user that the action was unsuccessful. The display window 210 also indicates that the initiator device 10A is performing the next action of storing the vCard. The display window 210 also may denote further details of an action, for example that the device is filing the vCard under the name "Friend, Best."

The title bar 132 includes a graphical element 212 that may be selected to skip an action within the workflow. For example, if the user does not want to store the vCard, the user may select the graphical element 212 to proceed to the next action in the workflow. In certain embodiments, the device may be configured to proceed through each of the workflow actions, displaying notifications indicating the status of each action as the action is performed. However, in other embodiments, the device 10A may prompt a user to accept an action before proceeding to the next action in the workflow.

Graphical elements 214 and 216 allow a user to edit or accept an action that has been performed. Specifically, the graphical element 214 may be selected to edit or view the vCard. For example, the user may select the graphical element 214 to show the stored contact information and add additional contact information that may not have been included on the vCard. If the user does not wish to edit the information, the user may select the graphical element 216 to accept the action and proceed to the next action in the workflow.

After the vCard has been obtained and stored, the device may initiate the next action, taking a picture of the contact. The workflow may instruct the initiator device 10A to open the camera application and display a screen 218 for capturing an image of the contact person. The screen 218 includes a frame 220, consisting of two corners disposed on the screen 218, that identifies the borders of received images. The frame 220 may function as a view finder for the camera 46 (FIG. 2). However, in other embodiments, the frame 220 may be omitted, and the entire display area may be used to receive the image.

Instructions 222 prompt the user to take a picture of the contact. The user may position the device 10A so that an image of the contact person is aligned within the frame 220, and then the user may select the graphical element 224 to capture the image. Of course, if the user does not want or require a picture of the contact person, the user may select the graphical element 212 to skip this step. After a user captures an image by selecting the graphical element 224, the initiator device may display a screen 228 indicating that the picture has been stored.

A display window 230 may show the notification message and may further indicate that the initiator device is performing the next action of sending a friend request for adding the contact as a friend on a social networking site, such as Facebook. After the friend request have been received and the contact person has been added as a friend, the initiator device may display a screen 232 with a display window 234 indicating that the workflow is complete.

The screen 232 also may include a graphical element 236 for viewing properties of the last completed action. For example, the user may select the graphical element 236 to proceed to the contact's profile page on Facebook. If the user does not wish to view the profile, the user may select the graphical element 238 to end the workflow. In certain embodiments, selection of the graphical element 238 may return the user to the home screen shown in FIG. 1. The user also may select the graphical element 156, located in the title bar 132, to return to the workflow screen 128 shown in FIG. 7 where the user may perform another workflow or may perform a workflow related function.

Figure 11:
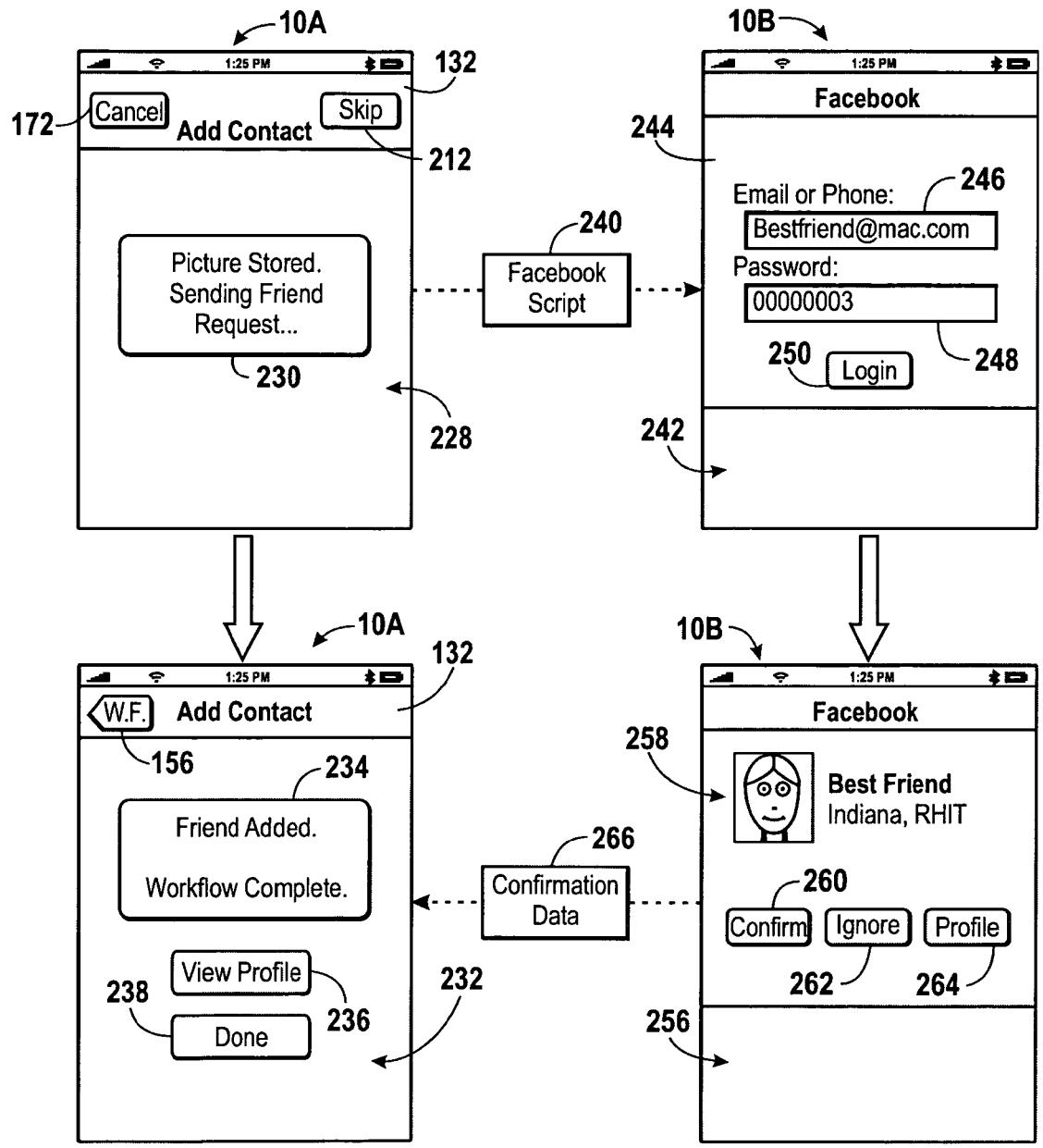
FIG. 11 is a schematic diagram illustrating the interaction between the device of FIG. 1 and a target device when performing a portion of the workflow of FIG. 10 in accordance with one embodiment.

FIG. 11 illustrates an interaction that may occur between the initiator device 10A and the target device 10B while performing one of the actions within a workflow. Specifically, FIG. 11 illustrates performing the action of adding a contact as a Facebook friend as described with respect to FIG. 11. The device 10A may begin the action by connecting to Facebook and sending a friend request for adding the contact as a friend. In certain embodiments, the device 10A may use information from the vCard to generate and transmit the friend request. For example, the device 10A may extract the name of the contact person from the vCard.

The initiator device 10A may then transmit a workflow script 240 to the target device 10B. The workflow script may include code that instructs the target device 10B to navigate to the Facebook site and confirm the friend request generated by the initiator device 10A. As noted above, the workflow script 240 may be generated based on the target properties 98 (FIG. 5) received by the device 10A. For example, the target properties may specify whether the target device 10B is capable of connecting to the Internet. If the target device 10B has an Internet connection, the Facebook script may include instructions for directing the target device 10B to the Facebook site through the Internet. However, if the target device 10B is unable to connect to the Internet, the Facebook script may include XML messages that include instructions for displaying a screen that simulates the Facebook website. In these embodiments, the login information may be transmitted back to the initiator device 10A for subsequent transmission to the Facebook website.

Using the Facebook script 240, the target device 10B may generate and display a screen 242. The screen may generated based on XML messages received with the workflow script 240 or the screen may be displayed when the device executes the workflow script 240 and navigates to the Facebook website through the Internet. The screen 242 includes a display area 244 that displays the Facebook website or a simulation thereof. Display areas 246 and 248 may be used to receive the login information for the contact person. The screen 242 prompts the contact person to enter the login information and after entry, the contact person may select the graphical element 250 to login to the Facebook website. In other embodiments, the Facebook script 240 may instruct the target device 10B to retrieve login information stored on the target device 10B. In these embodiments, the target device 10B may log the contact person into the Facebook website and the screen 242 may be omitted.

Upon login, the Facebook script 240 may direct the device to display the pending friend request on a screen 256. A display area 258 may be used to display the request as shown on the Facebook website. The display area 258 includes graphical elements 260 and 262 for confirming or ignoring the friend request. Specifically, the contact person may select either the graphical element 260 or the graphical element 262 to confirm or ignore the friend request, respectively. Another graphical element 264 may be used to view profile information for the friend.

The target device 10B may receive the user selection and transmit data 266 corresponding to the selection to the initiator device 10A. For example, the Facebook script 240 may include instructions directing the target device 10B to transmit the confirmation or rejection to the initiator device 10A as the confirmation data 266. The initiator device 10A may then receive the confirmation data 266 and display the screen 232 indicating that the friend has been successfully added and that the workflow is complete. Although the specific screens displayed on the devices 10A and 10B may vary, the interaction between the initiator device 10A and the target device 10B may occur in a similar manner for each action within a workflow.

Figure 12:
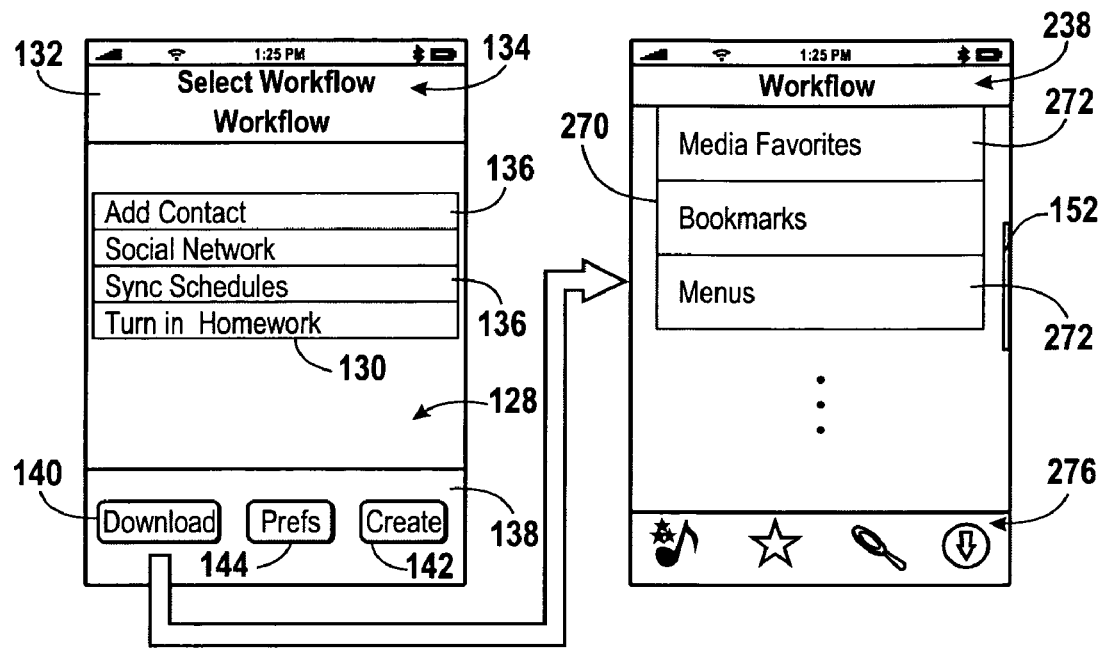
FIG. 12 is a front view of screens of the device of FIG. 1 illustrating a method of downloading a workflow in accordance with one embodiment.

The manufacturer or service provider for the initiator device 10A may load workflows on the initiator device 10A. However, workflows also may be downloaded by a user. FIG. 12 illustrates screens that may be used to download workflows from a web service, such as iTunes®. A user may initiate then download process by selecting the graphical element 140 from the main menu screen 128. Selection of the graphical element 128 may connect the device 10A to a web service and display a screen 268 showing the web service. The screen 268 may include a display window 270 listing the workflows available for download. The scroll bar 152 may be used to view additional workflows not currently shown on the screen 268.

Selection bars 272 within the display window 270 may correspond to individual workflows that are available for download. For example, workflows for transmitting media favorites, exchanging bookmarks, and transferring menus may be available. In one embodiment, the "Media Favorites" workflow may be used to transfer favorite playlists between devices. For example, the "Media Favorites" workflow may direct the initiator device to send the top five playlists stored on the device 10A to the target device 10B. The workflow also may direct the target device 10B to reciprocate by sending its top five playlists to the initiator device 10A.

In another embodiment, the "Bookmarks" workflow may be used to transfer Internet bookmarks between the devices 10A and 10B. For example, the "Bookmarks" workflow may prompt a user of the initiator device 10A to enter or navigate to a bookmark folder for transmission to the target device 10B. The target device 10B may prompt its user to select a similar bookmark folder to transmit to the initiator device 10A.

In yet another embodiment, the "Menus" workflow may be used to obtain food orders and to generate a food delivery order. For example, the workflow may be used to order pizza and sandwiches in an office environment for a lunchtime meeting. When selected, the "Menus" workflow may prompt the user to select a menu form a group of menus included within the workflow. Each person attending the lunchtime meeting may then tap his target device to the initiator device 10A to view the menu. The workflow script may instruct each target device to display the menu and to prompt the user to enter a lunch order. After receiving the lunch order, the target device 10B may transmit the order to the initiator device, and the initiator device may then place the order by transmitting it over the Internet to the restaurant. Of course, these workflows are provided by way of example only. Any number and type of actions may be complied into a workflow and made available for download.

To download a workflow, a user may select a selection bar 272 to download the corresponding workflow. In certain embodiments, selection of a selection bar 272 may display a screen further describing the workflow prior to download. The screen 268 also may include a lower summary bar 276 that displays selectable icons for navigating to other areas of the web service.

Figure 13:
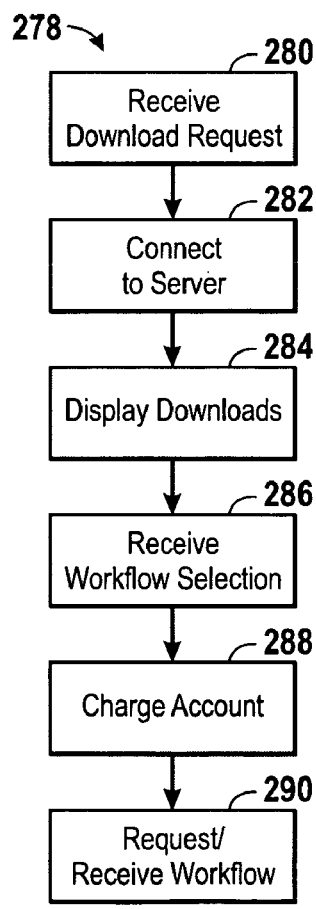
FIG. 13 is a flowchart depicting a method for downloading a workflow in accordance with one embodiment.

FIG. 13 is a flowchart depicting an exemplary method 278 for downloading a workflow as illustrated in FIG. 12. The method may begin by receiving (block 280) a download request. The request may be received through the graphical user interface 28 (FIG. 1), for example, by selection of the download graphical element 140 shown on the screen 128 in FIG. 12. In response to receiving a download request, the device 10A may connect to a server containing a database of workflows available for download. In certain embodiments, the device may connect through a web service such as iTunes®.

The initiator device 10A may be configured to log a user into a web service account or to prompt the user to open an account with the web service. The device may then display (block 284) the workflows available for download. For example, the workflows may be displayed on the screen 268 show in FIG. 12. The device 10A may then receive (block 286) selection of a workflow to download. For example, the selection may occur when a user selects one of the selection bars 272 corresponding to a workflow shown in FIG. 12. After receiving a selection, the device 10A may charge the user's account (block 288). In other embodiments, the workflow may be available as part of a device media plan and, therefore, no additional charge may be incurred. After charging the account, the device 10A may request and receive (block 290) the workflow through the web service. For example, the workflow may be received through one of the communication interfaces 56 (FIG. 3). The device 10A may store the received workflow within the storage 54 (FIG. 1).

Figure 14:
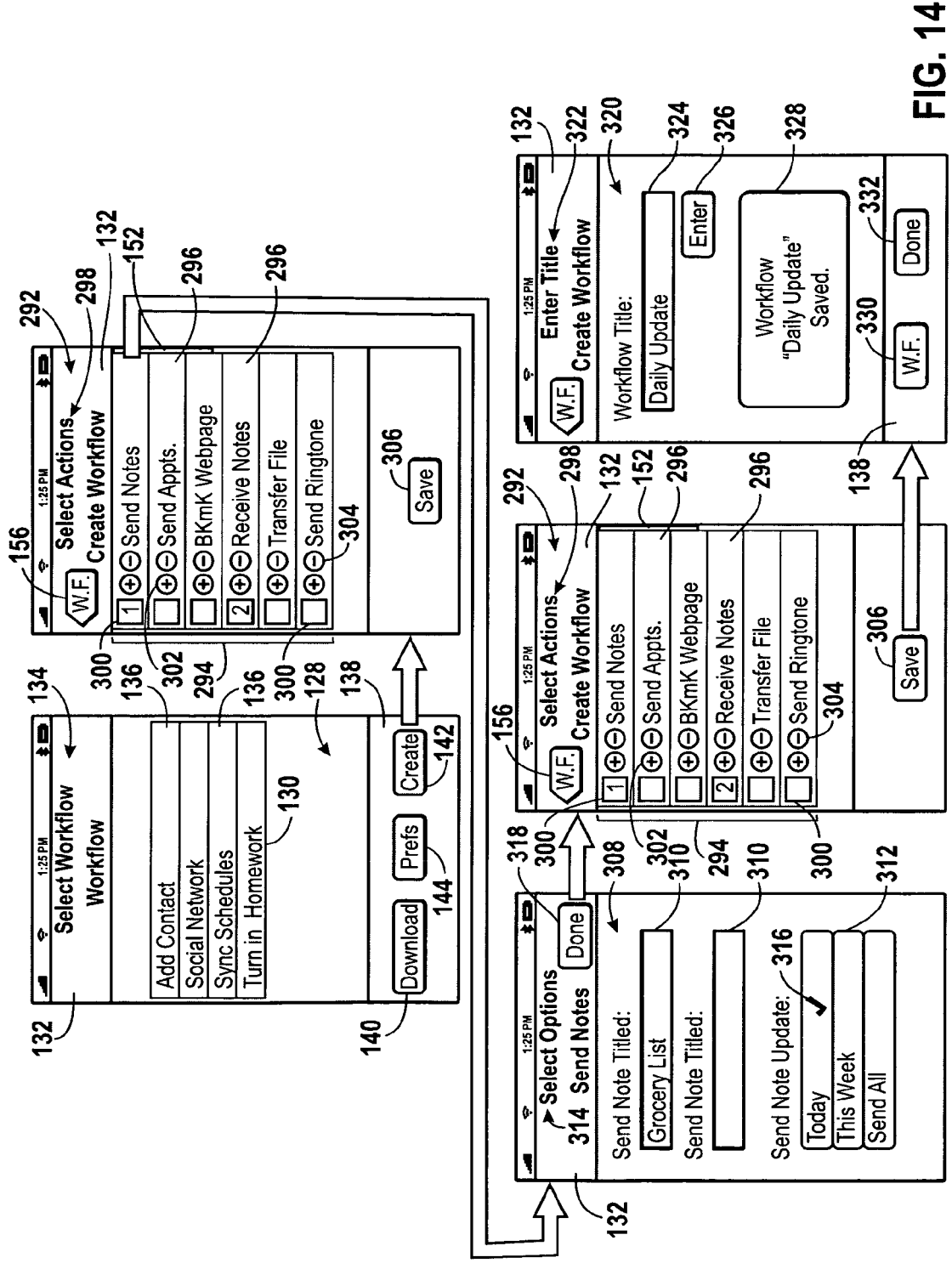
FIG. 14 is a front view of screens of the device of FIG. 1 illustrating a method of creating a workflow in accordance with one embodiment.

In addition to, or instead of, downloading workflows, a user may be able to create workflows from the device 10A. FIG. 14 illustrates a series of screens for creating a workflow. The creation process may begin upon selection of the graphical element 142 shown on the main menu screen 128. In response to selection of the graphical element 142, the device 10A may display a workflow creation screen 292. The screen 292 includes a display area 294 that lists the actions that may be combined into a workflow. Additional actions may be viewed using the scroll bar 152. Selection bars 296 correspond to each individual action may be selected to display additional details about each action.

The actions may include functions that can be performed by the initiator device 10A as well as functions that may be transmitted to and performed by the target device 10B. For example, the actions may include sending notes stored within the initiator device 10A to the target device 10B. The actions also may include receiving notes stores within the target device 10B. As will be appreciated, the actions listed on screen 292 are provided by way of example and are not intended to be limiting.

Instructions 298 prompt the user to select actions for the workflow. The actions may be selected using selection boxes 300 included within the selection bars 296. The selection boxes 300 may display numbers indicating the order that they have been selected in. For example, the "Send Notes" action displays a number one indicating that this is the first action in the workflow. The "Receive Notes" action displays a number two indicating that it is the second action to be performed in the workflow. Graphical elements 302 and 304 may be selected to increase or decrease the order of each action within the workflow. For example, the graphical element 302 represents a plus sign may be selected to increase the number within a selection box 300 by one increment. The graphical element 304 may be selected to decrease the number within the selection box 300 by one increment. Using the selection boxes 300 and then graphical elements 302 and 304, a user may add actions 296 to the workflow and specify the order in which the actions are to be performed.

After all of the desired actions have been selected and prioritized, the user may select the graphical element 306 to save the workflow. For example, the workflow may be saved within the storage 54 of the device 10A. The user may also select the selection bar 296 to display options available for a corresponding action. For example, the "Send Notes" selection bar 296 may be selected to display a screen 308 for customizing options for the "Send Notes" action.

The screen 308 includes display areas 310 that may be used to enter titles of the notes to be retrieved from the initiator device 10A and sent to the target device 10B using the workflow. For example, a user may maintain a note on the initiator device 10A that is titled "Grocery List" to keep track of items needed from the grocery store. Any number of selection bars 310 may be included within the screen 308 to allow entry of multiple titles.

The screen 308 also includes a series of selection bars 312 that may be selected to specify the notes to be sent using the "Send Notes" action. For example, the user may select the "Today" selection bar 312 to send notes that have been updated within the past 24 hours. Instructions 314 prompt the user to select the options using the selections bars 310 and 312. When one of the selection bars 312 is selected, an indication 316, shown here as a check mark, may appear within the selection bar 312 to notify the user that this selection is active. After a user has entered all of these desired options, a user may select the graphical element 318 to finish the option selection process and return to the create workflow screen 292. The user may then select the save graphical element 306 to store the workflow.

Selection of the graphical element 306 may display a screen 320 prompting the user to enter a title for the workflow. Instructions 322 may prompt the user to enter the title in a display area 324. After the title has been entered, for example, using a keypad of the GUI 28 (FIG. 1), the user may select the graphical element 326 to submit the title. The initiator device 10A may then store the workflow and display an indication within a display window 328 to indicate that the workflow has been saved. The user may then select a graphical element 330 to return to the workflow main menu screen 128 shown in FIG. 7. The user also may select graphical element 332 to return to the home screen shown in FIG. 1.

Figure 15:
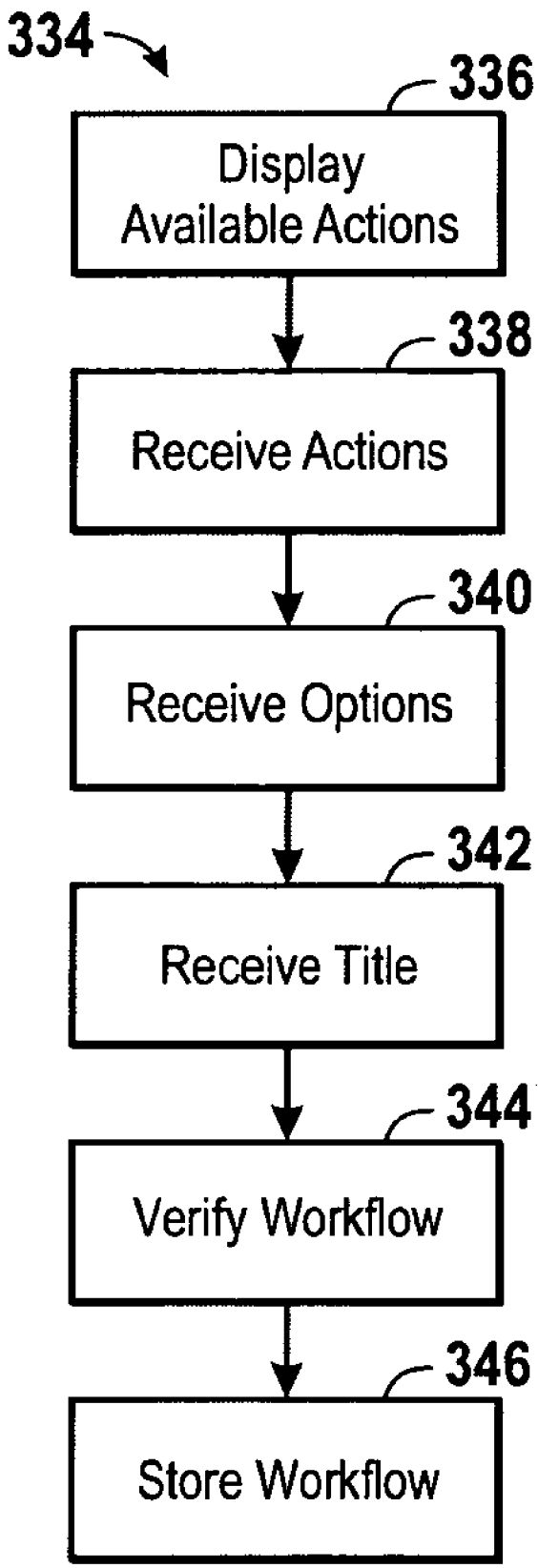
FIG. 15 is a flowchart depicting a method for creating a workflow in accordance with one embodiment.

FIG. 15 is a flowchart depicting an exemplary method 334 for creating a workflow as illustrated in FIG. 14. The method may begin by displaying (block 336) available actions that may be combined into a workflow. Of course, a workflow may consist of one or more actions. The available actions may be stored within the device 10A and may include actions supplied by the device manufacturer as well as actions received from the web service or from another electronic device. The device may then receive (block 338) user selections specifying the actions to include in the workflow. For example, a user may select the selection bars 296 shown on the screen 292 in FIG. 14 to identify and prioritize the actions. The device also may receive (block 340) user inputs selecting options corresponding to some, or all of, the actions. In certain embodiments, the actions may be stored with default options assigned so that a user may not need to enter options if the default options are acceptable. However, the user may still be able change the default options through a screen such as the screen 308 shown in FIG. 14.

After receiving the options, the device may receive a title (block 342) to assign to the workflow. For example, a user may enter a title through the screen 320 shown in FIG. 14. The initiator device 10A may then verify (block 344) the workflow. In certain embodiments, the initiator device may simulate performing the workflow to ensure that the initiator device 10A includes the functionality and input devices required to perform workflow. After verification, the initiator device 10A may store (block 346) the workflow. For example the workflow may be stored as one of the workflows 74 within the storage 54 (FIG. 2).

Figure 16:
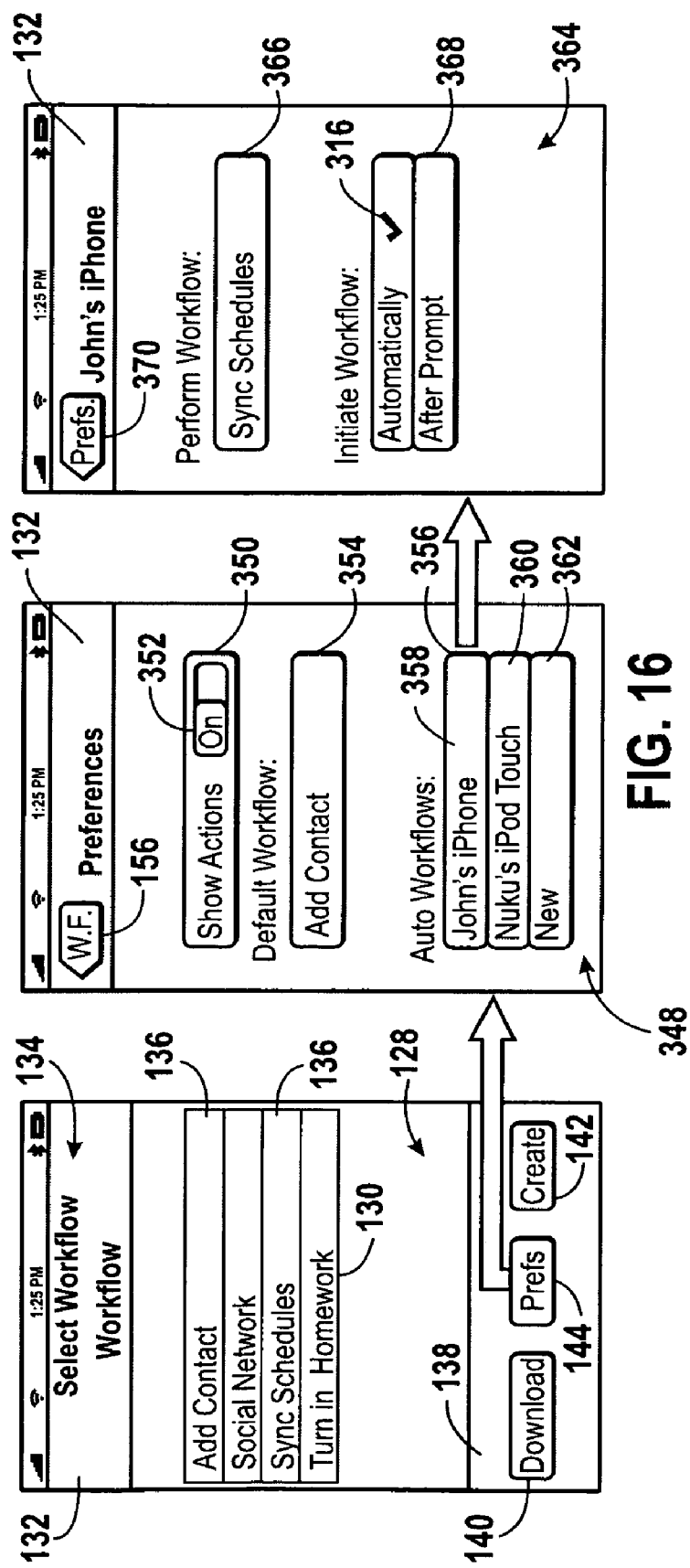
FIG. 16 is a front view of screens of the device of FIG. 1 illustrating a method of setting workflow preferences in accordance with one embodiment.

The workflows stored on the device 10A may be executed when they are selected by the user through the main menu screen 128 shown in FIG. 7. Further, the workflows may be executed based on preferences 72 (FIG. 2) stored within the device 10. FIG. 16 illustrates a series of screens for entering preference for the workflows. From the main menu screen 128, a user may select the graphical element 144 to access the preferences 72 through a preference screen 348. The screen 348 includes a display window 350 that shows the status of one of the workflow preferences for showing actions included within the workflow. A slider 352 may be used to turn this preference on or off. For example, a user may drag the slider 352 to the right to turn the "Show Actions" preference off. Specifically, the "Show Actions" preference may govern whether the actions within a workflow are shown at the beginning of the workflow. For example, referring to FIG. 8, when the "Show Actions" preference is turned on, the actions within the workflow may be listed as the selection bars 150 as shown on the screen 146. If the "Show Actions" preference is turned off, the actions may be hidden and not shown on the screen.

The preferences also may include an option for automatically performing a workflow upon detecting a near field communication link. The screen 348 includes a display window 354 that may be used to select a default workflow. For example, the selection bar 354 may be selected to display a list of workflows that may be entered as the default workflow. As shown, the user has selected the "Add Contact" workflow as the default workflow. In this example, the device 10A may automatically initiate the "Add Contact" workflow when the device 10A detects a near field communication link 88 (FIG. 5) with a target device 10B.

The preferences also may include automatic workflows that may be performed based on detection of a specific target device. The screen 348 includes display windows with selection bars 358, 360, and 362 that can be programmed to correspond to specific devices. Specifically, the selection bar 358 has been programmed to correspond to John's iPhone® and the selection bar 260 has been programmed to correspond to Nuku's iPod® Touch. To program a selection bar, a user may select one of the selection bars 358, 360, or 362 to enter or edit a target device. For example, a user may select the selection bar 362 may to add a new target device with an associated automatic workflow. In another example, a user may select the selection bar 358 to display a screen 364 for editing the preferences for John's iPhone®.

The preference screen 364 may include a selection area 366 that may be selected to assign a workflow to the target device. The user may input the workflow using the GUI 28 (FIG. 1), and as shown, the user has selected a workflow for synchronizing schedule. In response to detecting a close range communication link with the specified target device, shown here as John's iPhone®, the initiator device 10A may initiate the "Sync Schedules" workflow. The initiator device 10A may recognize the specific target device 10B based on identification properties of the target device 10B. For example, a user may connect to a desired target device 10B through a close range communication link 88 (FIG. 5) and then press the selections bar 362 to set up an automatic workflow for that target device 10B. The initiator device 10A may be configured to retrieve and store a device identifier for the specific target device 10B in response to selection of the selection bar 362.

The screen 364 also includes a display window 368 that allows a user to specify when workflow should begin. The indicator 316 is currently show on the option to initiate a workflow automatically to indicate that the sync schedules workflow will be initiated when the device 10A detects a close range communication link 88 (FIG. 5) with the specified target device 10B. A user also may choose to authorize the workflow before the workflow begins by selection the option to initiate the workflow after a prompt from the user.

Figure 17:
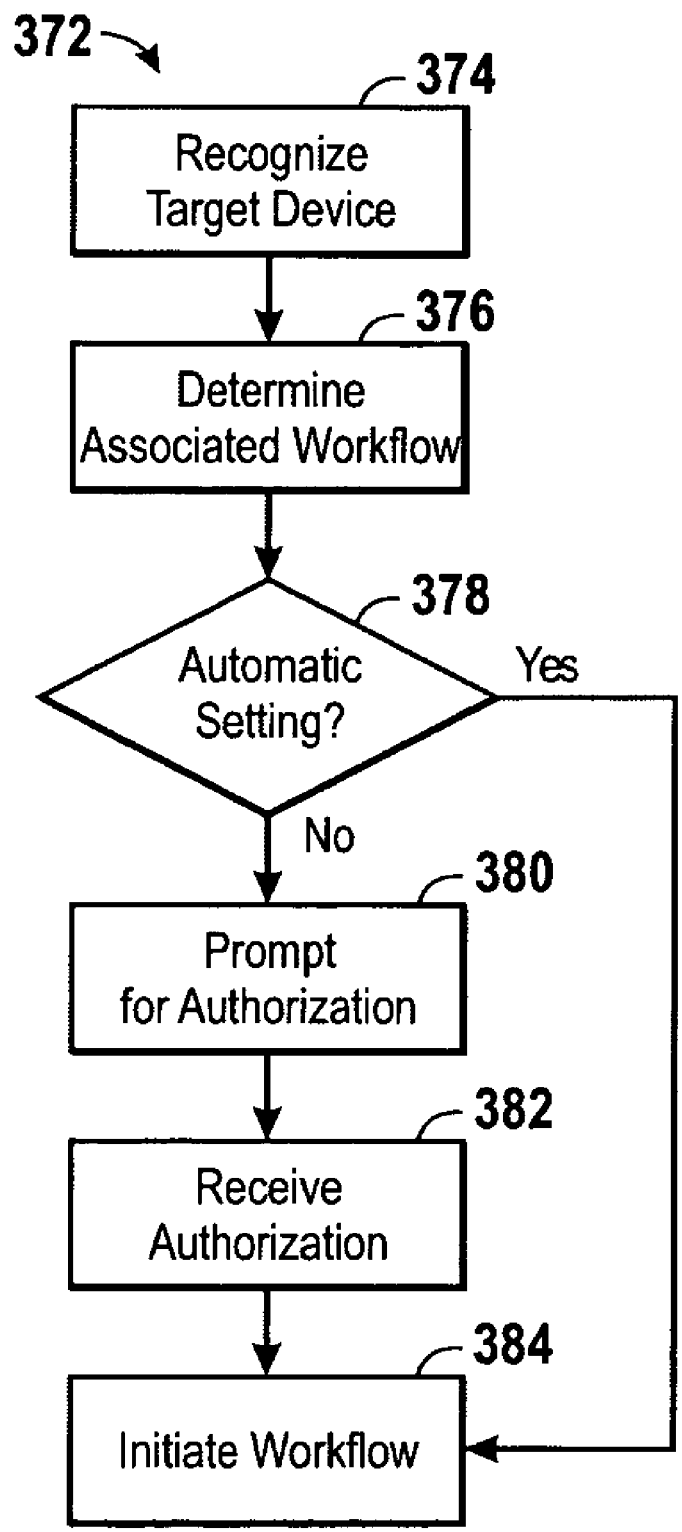
FIG. 17 is a flowchart depicting a method for initiating a workflow with a preferred target device in accordance with one embodiment.

FIG. 17 is a flowchart depicting an exemplary method 372 for performing an associated workflow in response to detecting a specific target device as illustrated in FIG. 16. The method may being by recognizing (block 374) the specific target device. The device 10A may recognize the target device 10B based on a property of the target device 10B such as a device identifier transmitted through the close range communication link 88 (FIG. 5). The device 10A may then determine (block 376) the workflow associated with the recognized target device 10B. For example, the storage 54 (FIG. 1) may include a table associating workflows with specific target devices. The device 10A may then determine (block 378) whether the preferences have been set to the automatic settings. If the preferences have not been set to initiate the workflow automatically, the device may prompt (block 380) the user for authorization to initiate the associated workflow. Upon receiving (block 382) the authorization, the device 10A may initiate (block 384) the workflow. If the automatic setting has been applied, the device 10A may initiate the workflow without prompting the user for authorization. The workflow may be initiated and performed as illustrated by FIGS. 5-10.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for determining a sequence of actions to be performed using an initiator device and a target device, the method comprising:
    displaying on the initiator device a menu screen that presents a plurality of action sequences stored on the initiator device, wherein each of the plurality of action sequences comprises one or more actions executable by the initiator device, and wherein at least one of the actions within each of the plurality of action sequences employs data, received from the target device, in an application stored on the initiator device to complete the at least one action on the initiator device;
    receiving a user input selecting an action sequence from the plurality of action sequences;
    receiving properties from the target device that describe functionality of the target device for performing the actions of the selected action sequence; and
    determining instructions for the selected action sequence based on the received properties, wherein the instructions enable the target device to execute the selected action sequence and wherein determining instructions comprises:
        retrieving a workflow script corresponding to the selected action sequence and customizing the workflow script based on the received properties of the target device to enable the target device to generate the data for the application stored on the initiator device, wherein a corresponding application is not present on the target device; and
        customizing the workflow script based on the received properties of the target device to remove one or more actions of the selected action sequence that are unsupported by the target device.

2. The method of claim 1, wherein receiving properties comprises establishing a near field communication link between the target device and the initiator device.

3. The method of claim 1, wherein the selected action sequence comprises a plurality of actions and wherein determining instructions comprises:
    displaying on the initiator device a summary screen that identifies each of the plurality of actions of the selected action sequence;
    receiving a user input selecting at least one of the plurality of actions for removal from the selected action sequence; and
    customizing the workflow script to remove the selected action from the selected action sequence.

4. The method of claim 1, wherein determining instructions comprises accessing preferences stored in the initiator device to identify data files stored in the initiator device or the target device for retrieval using the instructions.

5. The method of claim 1, comprising initiating the selected action sequence on the initiator device in response to receiving a device identifier from the target device, wherein the device identifier is associated with the selected action sequence.

6. The method of claim 1, comprising storing a data file received from the target device in a storage location of the initiator device, wherein the data file is determined by the target device using the instructions.

7. The method of claim 1, wherein receiving properties comprises requesting the properties from the target device, and wherein the requested properties are determined based on the selected action sequence.

8. The method of claim 1, wherein the properties specify an operating system for the target device or a software application stored on the target device, or a combination thereof.

9. The method of claim 1, wherein displaying on the initiator device a menu screen comprises displaying the menu screen in response to detecting a near field communication link between the initiator device and the target device.

10. The method of claim 1, wherein at least one of the plurality of action sequences comprises an action sequence for exchanging contact information, and wherein the action sequence for exchanging contact information comprises an action for obtaining electronic contact information for a new contact person and an action for taking a picture of the new contact person.

11. The method of claim 1, wherein at least one of the plurality of action sequences comprises an action sequence for connecting to a contact person on a social networking site, and wherein the action sequence for connecting to a contact person on a social networking site comprises actions including navigating to the social networking site, entering contact information for the contact person on the social networking site, and requesting a connection to the contact person through the social networking site.

12. The method of claim 1, wherein customizing the workflow script comprises associating the workflow script with a device identifier received from the target device to enable the initiator device to initiate the selected action sequence in response to detecting a near field communication link between the initiator device and the target device.

13. A method of creating an action sequence for an initiator device, the method comprising:
displaying a graphical user interface presenting a plurality of user selectable actions on the initiator device, each of the selectable actions having corresponding instructions stored in the initiator device;
receiving a user input selecting two or more actions from the plurality of user selectable actions, wherein at least one of the selected two or more actions employs data, received from a target device, in an application stored on the initiator device to complete the at least one action on the initiator device;
compiling the selected two or more actions into an action sequence based on the user input;
generating a workflow script for the action sequence based on the corresponding instructions;
receiving properties from the target device that describe functionality of the target device for performing the selected two or more actions of the action sequence;
customizing the workflow script based on the received properties of the target device to enable the target device to generate the data for the application stored on the initiator device, wherein a corresponding application is not present on the target device; and
customizing the workflow script based on the received properties of the target device to remove one or more actions of the action sequence that are unsupported by the target device.

14. The method of claim 13, wherein receiving a user input comprises displaying a screen of the user interface to facilitate user identification of an order of execution for the selected two or more actions, and wherein the workflow script enables the initiator device to perform the selected two or more actions in the user identified order of execution.

15. The method of claim 13, comprising displaying a screen of the user interface for assigning preferences to the action sequence, wherein the preferences determine whether the action sequence is initiated automatically or is initiated in response to receiving a user acknowledgement.

16. The method of claim 13, comprising:
verifying the action sequence to ensure the functionality of the electronic initiator device supports each of the selected two or more actions in the action sequence; and
storing the action sequence within the initiator device.

17. The method of claim 13, comprising:
displaying a screen for associating the target device with the action sequence; and
associating the workflow script with a device identifier of the target device to enable the initiator device to initiate the selected action sequence in response to detecting a near field communication link between the target device and the initiator device.

18. The method of claim 13, wherein the plurality of user selectable actions comprise an action for exchanging contact information and an action for taking a picture.

19. The method of claim 13, wherein generating a workflow script comprising customizing one or more of the corresponding instructions based on the received properties of the target device.

20. An electronic device for determining a sequence of actions to be performed using the electronic device and a target device, the electronic device comprising:
means for displaying on the electronic device a menu screen that presents a plurality of action sequences stored on the electronic device, wherein each of the plurality of action sequences comprises one or more actions executable by the initiator device, and wherein at least one of the actions within each of the plurality of action sequences employs data, received from the target device, in an application stored on the initiator device to complete the at least one action on the initiator device;
means for receiving a user input selecting an action sequence from the plurality of action sequences;
means for receiving properties from the target device that describe functionality of the target device for performing the actions of the selected action sequence; and
means for determining instructions for the selected action sequence based on the received properties, wherein the instructions enable the target device to execute the selected action sequence and wherein determining instructions comprises:
retrieving a workflow script corresponding to the selected action sequence and customizing the workflow script based on the received properties of the target device to enable the target device to generate the data for the application stored on the initiator device, wherein a corresponding application is not present on the target device; and
customizing the workflow script based on the received properties of the target device to remove one or more actions of the selected action sequence that are unsupported by the target device.

21. The electronic device 20, wherein the means for receiving properties from the target device comprise a near field communication interface.

22. The electronic device of claim 20, wherein the means for determining instructions comprise a processor operably coupled to the means for receiving properties from the target device and configured to execute application instructions stored within a storage of the electronic device.

23. The electronic device of claim 22, wherein the application instructions comprise:
code to determine, based on the received properties, whether the target device supports the one or more actions in the selected action sequence;
code to retrieve a workflow script that corresponds to the selected action sequence; and
code to customize the workflow script based on the received properties to remove one or more actions of the selected action sequence that are unsupported by the target device.

24. A method for determining a sequence of actions to be performed using an initiator device and a target device, the method comprising:
displaying on the initiator device a menu screen that presents a plurality of action sequences stored on the initiator device, wherein each of the plurality of action sequences comprises two or more actions executable by the initiator device;
receiving a user input selecting an action sequence from the plurality of action sequences;
requesting properties from the target device that describe functionality of the target device for performing the actions of the selected action sequence;
receiving the properties from the target device;
identifying, based on the received properties, one or more actions in the selected action sequence that employ data, received from the target device, in an application stored on the initiator device and not present the target device; and
determining instructions for the selected action sequence based on the properties, wherein the instructions enable the target device to execute the selected action sequence, and wherein determining instructions comprises:
retrieving a workflow script corresponding to the selected action sequence and customizing the workflow script based on the received properties to enable the target device to generate the data for the one or more identified actions; and
customizing the workflow script based on the received properties to remove one or more actions of the selected action sequence that are unsupported by the target device.

25. The method of claim 24, wherein determining instructions comprises comparing the two or more actions of the selected action sequence to user preferences stored in the initiator device that identify user prohibited actions and customizing the workflow script to remove one or more actions of the selected action sequence that correspond to the user prohibited actions.

26. The method of claim 24, wherein the application comprises a web browser, and wherein customizing the workflow script comprises adding instructions to the workflow script for displaying a screen that simulates a website on the target device.

27. The method of claim 24, comprising customizing the workflow script to enable the initiator device to initiate the selected action sequence in response to detecting a near field communication link between the initiator device and the target device.

28. A method for determining a sequence of actions to be performed using an initiator device and a target device, the method comprising:
displaying on the initiator device a menu screen that presents a plurality of action sequences stored on the initiator device, wherein each of the plurality of action sequences comprises one or more actions executable by the initiator device, and wherein at least one of the actions within each of the plurality of action sequences employs data, received from the target device, in an application stored on the initiator device to complete the at least one action on the initiator device;
receiving a user input selecting an action sequence from the plurality of action sequences;
receiving properties from the target device that describe functionality of the target device for performing the actions of the selected action sequence; and
determining instructions for the selected action sequence based on the received properties, wherein the instructions enable the target device to execute the selected action sequence and wherein determining instructions comprises retrieving a workflow script corresponding to the selected action sequence and customizing the workflow script based on the received properties of the target device to enable the target device to generate the data for the application stored on the initiator device, wherein a corresponding application is not present on the target device;
wherein the selected action sequence comprises a plurality of actions and wherein determining instructions comprises:
displaying on the initiator device a summary screen that identifies each of the plurality of actions of the selected action sequence;
receiving a user input selecting at least one of the plurality of actions for removal from the selected action sequence; and
customizing the workflow script to remove the selected action from the selected action sequence.

* * * * *